3,038,868
ELASTOMERIC COMPOSITION CONTAINING A
CYANOALKYLAMINE
Rene G. Jennen, Detroit, Mich., assignor to Oliver W.
Burke, Jr., Grosse Pointe Park, Mich.
No Drawing. Filed Dec. 30, 1955, Ser. No. 556,423
6 Claims. (Cl. 260—4)

This invention relates to cyanoalkylamines, and reaction products including saponification products of certain of these cyanoalkylamines, some of which are new chemicals per se, and the use of these cyanoalkylamines and their reaction products as vulcanization aids.

These cyanoalkylamines and their reaction products can be used as vulcanization aids in combination with elastomers including synthetic elastomers and natural rubber. These synthetic elastomers, like natural rubber, are characterized in that they contain ethenoid unsaturation, $>C=C<$, and are sulfur vulcanizable, as hereinafter set forth.

Further, these new vulcanization aids can be used with fillers including active fillers and with both inorganic and organic type fillers including carbon black.

The cyanoalkylamines and their reaction products can be used in combination with both elastomers and fillers, and with other compounding ingredients.

This invention relates to the compounding and vulcanization of elastomers and the resulting vulcanizates, and aims generally to improve the same. In particular this invention aims to provide new and improved compounding recipes and new methods of vulcanization in which the vulcanization aid is from the group consisting of amines and polyamines N-substituted with cyanoalkyl groups with consequent improvement of such compound, the workability and vulcanization thereof, and the vulcanizate therefrom.

The invention is concerned with the use of cyanoalkylamines and their reaction products to improve the compounding of elastomers containing as reinforcing agent the vinylic fillers, especially the acid and carbonyl containing vinylic fillers, of the inventions disclosed by Oliver W. Burke, Jr. in his copending applications, viz., Serial No. 378,735, Serial No. 462,611, and Serial No. 538,728, filed on September 8, 1953, October 15, 1954, and October 5, 1955, respectively, counterparts of which have issued as Belgian Patents Nos. 531,665 (British Patent No. 799,043), 542,068 and 551,532, dated September 30, 1954, October 31, 1955 and October 31, 1956 respectively.

Further, this invention is concerned in part with improved compounding recipes useful for compounding elastomers reinforced with conventional reinforcing agents, such as carbon black, lignin, silica, clays, diatomaceous earths, titania, metal oxide, metal silicates, carbonates, and the like.

The present invention is particularly concerned with the provision of compounding recipes capable of imparting improved physical properties (tensile strength, elongation, heat building under flexure) to elastomer compounds containing the said conventionally used reinforcing agents as well as to elastomer compounds containing the vinylic fillers of said copending applications.

Also this invention is concerned with the development of tackiness, especially in synthetic elastomers, e.g., of the GR–S type, which tackiness is important in the fabrication of elastomer end items wherein mutual adhesion of elastomer components or coated components is required prior to vulcanization.

In addition, this invention is concerned with the improvement in curing rates of elastomer compounds so that a flat curve or plateau is obtained when the curing time-tensile properties relationship is represented graphically. This is of importance industrially in assuring the attainment of near optimum tensile properties of the vulcanizate over a fairly broad range of curing times and temperatures when the cyanoalkyl-amine curing aids of this invention are appropriately incorporated.

The invention is further concerned with the provision of amines active in vulcanization that melt below 285° F. and do not boil below 320° F., and that are soluble in the elastomer components of vulcanization recipes.

The invention is also concerned with the provision of new and useful cyanoalkyl-substituted-polyamines that produce flat cures, and with the provision of new and useful cyanoalkyl-substituted-polyamines that are precombinable advantageously with other ingredients of a compounding recipe to form a new compounding material, and with methods for preparing such new cyanoalkyl-substituted-polyamines.

TYPICAL KNOWN ELASTOMER CURING
PROCEDURES

It is well known in the art to vulcanize unsaturated elastomers, with or without fillers, by reaction with sulfur in the presence of curing additives to accelerate the rate of vulcanization and to develop useful tensile properties of the elastomer compound by such vulcanization. A typical compounding recipe for curing or vulcanizing a GR–S type elastomer is taken as an example from page 123, "The Vanderbilt Rubber Handbook," published in 1946 by R. T. Vanderbilt Co., 230 Park Ave., N.Y., viz:

*Recipe 1*

Ingredient:

| | |
|---|---|
| Elastomer _____ pts. by weight__ | 100 |
| MPC black _____ do____ | 50 |
| Stearic acid _____ do____ | 2 |
| Zinc oxide _____ do____ | 5 |
| Sulfur _____ do____ | 2 |
| Benzothiazyldisulfide (Altax) _____ do____ | 1.5 |
| Copper diethyldithiocarbamate (cumate) ___ do____ | 0.1 |
| Curing temperature _____ ° F__ | 287 |

With this formula employing GR–S elastomer an optimum tensile strength of 3010 p.s.i. at an elongation of 460% was obtained and a 300% modulus of 1640 p.s.i.

With natural rubber and sulfur and no other ingredients, a cure is attained in six hours at 287° F. and the vulcanization reaction is essentially the formation of sulfur cross-links between elastomer molecules. The carbon black (cf. Recipe 1) is a high-surface reinforcing material which forms strong bonds with the elastomer molecules. The zinc oxide in conventional recipes is added to accelerate the elastomer-sulfur cross-linking reaction (Vanderbilt Rubber Handbook, page 98), and with natural rubber the rate is increased about 15% so that five hours instead of six hours may serve to cure the rubber when the cure is effected with natural rubber, carbon black, sulfur and zinc oxide. To further accelerate the reaction an organic accelerator is conventionally used (such as benzothiazyl disulfide of Recipe 1) together with stearic acid as an activator for the accelerator. With such acceleration and stearic acid activation, the curing time can be cut to one hour. (Also the use of the accelerator permits the use of as little as 1.5 pts. of sulfur to effect good vulcanization.) The use of a small amount of an ultra accelerator (cumate in the above mentioned recipe may be replaced with tetraethylthiuramdisulfide) is important to attain still shorter cure times of the order of 15 to 45 minutes. This is especially necessary to obtain optimum cures in reasonable time with formulae such as Recipe 1 and elastomer stocks showing acidity, e.g., from the reinforcing agents (such as EPC, MPC, HPC carbon blacks, or such as the acid vinylic fillers of said copending patent applications of O. W. Burke, Jr), or from any other acid ingredient.

In curing GR–S elastomers, the addition of the stearic acid component to the curing system is not always necessary. In compounding natural rubber with the vulcanization aids of this invention the use of stearic acid is not always necessary and depends on the types of additional accelerators used. Also plasticizers, softeners and tackifiers are often used in compounding GR–S elastomers to improve tack and processibility. A final ingredient, an antioxidant, is ordinarily incorporated into the compounding recipe to protect against oxidative deterioration during processing or storage both prior to or following vulcanization.

Superior physical properties are obtained from GR–S and like elastomers by variation of the compounding formula, and Recipe 2, set forth below, is a typical, heretofore known, tire tread recipe herein employed in the preparation of the controls and, with inclusion of the new ingredients, for the compounding of the illustrative examples of the present invention.

*Recipe 2*

| Ingredients: | Parts |
|---|---|
| GR–S 1500 | 100 |
| Reinforcing agent | [1] 20 to 50 |
| Antioxidant (AgeRite Resin D) | 1 |
| Zinc oxide | 3 |
| Petroleum oil softener (½ Circosol 2XH, ½ Paraflux 2016) | 5 |
| Stearic acid activator | 1 |
| Organic accelerator N-cyclohexyl-2-benzothiazole sulfenamide (Santocure) | 1 |
| Sulfur | 1.75 |

[1] Variable, depending on type.

A typical cure with GR–S 1500, compounded according to Recipe 2 with 50 parts high abrasion furnace black (e.g., Philblack "O") is represented by the following data:

| Compound Mooney, ML–4 | 70 | 70 | 70 | 70 | 70 |
|---|---|---|---|---|---|
| Cure time at 285° F., min | 30 | 60 | 75 | 90 | 120 |
| Tensile strength, p.s.i | 2,500 | 3,000 | 3,300 | 3,400 | 3,200 |
| Elongation, percent | 650 | 550 | 500 | 500 | 470 |
| 300% modulus, p.s.i | 1,450 | 1,700 | 1,800 | 2,000 | 2,200 |
| Shore A hardness | 55 | 59 | 63 | 65 | 64 |

Many variations of the above recipe are practiced industrially, wherein other more or less equivalent ingredients are substituted for the specific items noted above and the amounts may be varied as appropriate to attain the curing rate desired for a certain production schedule, and the products disclosed in this invention can be used with benefit as a vulcanization aid when added, in appropriate amounts, to the compounding recipes employed by the art.

GENERAL DESCRIPTION

I have now discovered that incorporation of cyanoalkyl-amines, and particularly of polyamines substituted with cyanoalkyl groups, and especially with alpha-cyanoalkyl groups, show remarkable improvement in the stock and in the vulcanizates therefrom. Amines that are not cyanoalkyl substituted, such as aliphatic amines, have low boiling points and hence have high vapor pressures at ordinary temperatures, causing them to volatilize readily from the stock. They do not impart tack to the stock, and they produce peaked curing curves (Table 6). I have discovered that the corresponding cyanoalkyl substituted amines are as active in promoting the cure as the high volatile amines, and are advantageous in that they have high boiling points, above 320° F., and do not volatilize from the stock in storage or on the mill. In addition, as could not be anticipated, they contribute tackiness to the stock, facilitating the milling in of the compounding ingredients, and in addition, the alpha-cyanoalkyl substituted polyamines, as could not be anticipated, produce flat curing curves (Tables 9, 10, 13, 14, 16, 25, 35).

Thus the present invention shows that cyanoalkylated amines have advantages as curing aids over amines not so substituted, that the cyanoalkyl-substituted polyamines have additional advantage, and that the alpha-cyanoalkyl-substituted polyamines have still further advantages. The term "cyanoalkylated amine" as herein employed embraces the monocyanoalkyl-substituted and the dicyanoalkyl-substituted monoamines and the monocyanoalkyl-substituted and polycyanoalkyl-substituted polyamines.

AMINES EMPLOYABLE FOR CYANOALKYL SUBSTITUTION

As amines for substitution with cyanoalkyl groups are included those of the general formula

(1)

in which $R_1$ and $R_2$ are hydrogen or any organic radical. Thus the amines employable for cyanoalkyl substitution in accordance with this invention include both the primary and secondary amines. When $R_1$ and/or $R_2$ are hydrogen the additional H's also may be substituted with the cyanoalkyl radical.

When the amine is a polyamine, one of the radicals $R_1$ or $R_2$ may contain one or more additional amine or imino groups, and the hydrogens of such groups can also be cyanoalkyl-substituted in accordance with this invention.

The organic radicals $R_1$ or $R_2$ may be alkyl groups, oxaalkyl groups, and the like, and the aliphatic chain may carry a homocyclic or a heterocyclic ring.

Examples of the mono- and polyamines represented by the above formula are set forth in Tables 1 and 2, respectively.

MATERIALS EMPLOYABLE TO SUPPLY THE CYANOALKYL COMPONENTS

For producing the alpha-cyanoalkyl substituents, any cyanohydrin may be employed, of the general formula

(2)

in which $R_3$ and/or $R_4$ may be hydrogen or any organic radical. Examples are:

| $R_3$ | $R_4$ | Prepared from— | Common cyanohydrin (—HCN) name |
|---|---|---|---|
| —H | —H | Methanal —HCN | Formaldehyde —HCN, or glyconitrile. |
| —CH$_3$ | —H | Ethanal —HCN | Acetaldehyde —HCN, or lactonitrile. |
| —CH$_3$ | —CH$_3$ | 2-propanone —HCN | Acetone —HCN. |
| —CH$_3$ | —C$_6$H$_5$ | Methyl phenyl ketone —HCN | Acetophenone —HCN. |
| —CH$_3$ | —C(CH$_3$):CH$_2$ | 2-methyl-buten-3-one —HCN, etc. | |

These cyanohydrins react with the amines by substitution of one or more of the hydrogens of the NH$_2$ group, as:

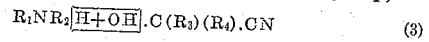

(3)

For producing the beta-nitrile substituents, acrylo- and meth-acrylo-nitrile may be employed. In this instance when the acrylonitrile (ethenyl or vinyl cyanide, CH$_2$:CH.CN) reacts with the amine (HNR$_1$R$_2$), addition takes place at the double bond, hydrogen attaching to the alpha carbon, and the amine radical (R$_a$NH—) attaching to the beta carbon, producing a beta-cyanoalkyl substituted amine of the type:

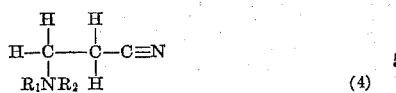
(4)

When the alkenyl cyanide is methacrylonitrile, the reaction the same, producing the homologous beta-cyanoalkyl-substituted amine:

(5)

Examples of these nitrile producing materials are included in Tables 1 and 2, and in Tables 3 to 38.

PREPARATION OF THE CYANOALKYL-SUBSTITUTED AMINES

The alpha-cyanoalkyl-substituted amines are simply prepared by the reaction of the amines with the cyanohydrin at 80° C., in benzene, say, as solvent, as follows:

$R_1NR_2H + cyanohydrin \rightarrow R_1NR_2\text{-cyanoalkyl} + H_2O$ (6)

and when $R_2$ is hydrogen:

$R_1NH\text{-cyanoalkyl} + cyanohydrin \rightarrow$
$R_1N(\text{cyanoalkyl})_2 + H_2O$ (7)

and when $R_1$ is also hydrogen:

$NH(\text{cyanoalkyl})_2 + cyanohydrin \rightarrow N(\text{cyanoalkyl})_3$ (8)

The water is removed by azeotropic distillation from the reaction mixture. The cyanoalkyl groups may be identical, or all different, or two identical, and one dissimilar, as desired.

The N-beta-cyancalkyl-substituted amines are also easily prepared by reaction of the alkenyl nitrile with the amine as follows:

$H_2C{:}C(R).CN + R_1NR_2H \rightarrow H_2C(R_1NR_2).CHR.CN$ (9)

in which R is hydrogen or an organic radical such as alkyl, aryl, etc., and $R_1$ and $R_2$ are the radicals of the amine.

As a key to the nomenclature employed herein may be cited the following:

TYPICAL ALPHA-CYANOALKYL-SUBSTITUTED AMINES

Cyanoalkyl-amine

(01)

(from glyconitrile)
Cyanomethyl-isopropylamine, or with two substitutions: Di-cyanomethyl-isopropylamine.
Or if ammonia is employed ($R_1$ and $R_2$ both hydrogens) the tricyanoalkyl amine can be formed.

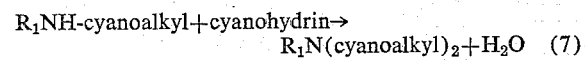
(11)

(from methyl lactonitrile)

N-(alpha-cyano-alpha-methyl-ethyl)-phenylenediamine, or with more substitutions:

N,N'-di(alpha-cyano-alpha-methyl-ethyl)-phenylenediamine,
N,N,N'-,tri-(alpha-cyano-alpha-methyl-ethyl)-phenylenediamine,
N,N,N',N'-tetra-(alpha-cyano-alpha-methyl-ethyl)-phenylenediamine.

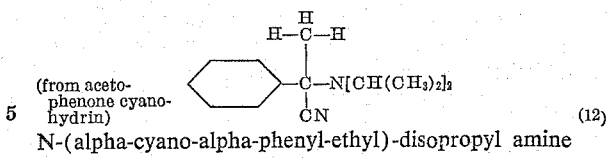
(12)

N-(alpha-cyano-alpha-phenyl-ethyl)-disopropyl amine

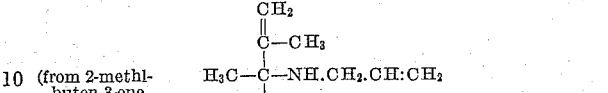
(13)

N-(alpha-cyano-alpha-methyl-beta-methyl-allyl)-allyl amine,
Di-(alpha-cyano-alpha-methyl-beta-methyl-allyl)-allyl amine.

TYPICAL BETA-CYANOALKYL-SUBSTITUTED AMINES

Beta-cyanoalkyl-amine
(from acrylonitrile and ammonia) Mono-, di-, and tri-beta-cyanoalkyl amines are made (14)

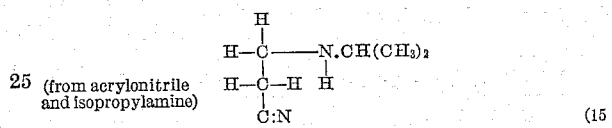
(15)

Beta-cyanoethyl-isopropylamine,

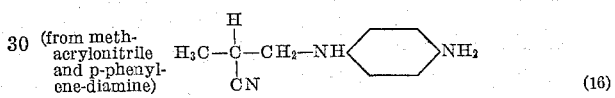
(16)

N-(beta-cyanopropyl)-phenylenediamine,
N,N'-di(beta-cyanopropyl)-phenylenediamine,
N,N,N'-tri(beta-cyanopropyl)-phenylenediamine,
N,N,N',N'-tetra(beta-cyanopropyl)-phenylenediamine.

To further exemplify the derivation and nature of new vulcanization aids of the present invention, Tables 1 and 2 set forth respectively, reaction of typical cyanohydrins with typical amines and polyamines, and physical properties of the resulting cyanoalkyl-substituted amines and polyamines. It will be noted from Examples 2–11 to 2–13 that mixed polyethylene-polyamines yield substituted amine products similar to those obtained with the individual amines, and which, as is shown in Table 8, are valuable vulcanization aids. When lactontirile is used with the amines as illustrated in Tables 1 and 2, then the resultant cyanoalkyl amines are N-substituted-alpha-amino-propionitriles.

Before listing the remaining tables to constitute an index thereto, the following points should be noted:

(1) The more volatile unsubstituted aliphatic amines, e.g., methyl-, ethyl-, propyl-, butyl-, allyl-, heptyl-, tert-octyl-amines, etc., developed good tensile properties in the elastomers when curing was carried out soon after mixing small amounts of such amines with the elastomer compound, but if the so prepared compounds were stored for more than 12 hours the optimum tensile properties were no longer obtainable.

(2) In no instance was tackiness or the desired flat curing curve obtained with these prior known unsubstituted aliphatic amines.

(3) When higher alkyl and aryl amines not substituted with cyano-alkyl groups were employed (e.g., higher alkyl amines such as stearylamine, $C_{18}$ to $C_{24}$ alkyl amines, terpene amines such as rosinamine, etc. and arylamines such as phenyl-beta-naphthylamine, diphenylamine, aniline, and other aryl amines, as known to the art) the novel results obtained with the cyanoalkyl substituted amines in accordance with this invention also could not be attained, and the amines tended to act as plasticizer of the elastomer.

(4) When similar amines and polyamines N-substituted with cyanoalkyl groups were employed in accordance with the present invention, however, the cures were improved, tackiness was imparted to the stocks, and, with polyamines substituted with alpha-cyanoalkyl, the greatly to be desired flat cures were obtained.

(5) The amounts of cyanoalkylamines required to practice this invention vary as a result of a number of factors: among such factors the type of reinforcing filler in the elastomer compounds, the acidity or pH of the compound in the absence of the amine and the nature of the cyanoalkyl amine employed, etc., are of especial importance. While a stock containing carboxyl or carbonyl groups requires somewhat more of the cyanoalkylamine, the definite improvement in the vulcanization resulting from such stock justifies its use and the augmented use of such amine. Thus, the invention includes the addition of the cyanoalkylamines specified herein in amounts of 0.05 to 10 parts per 100 of elastomer, depending on the other factors mentioned.

(6) The cyanoalkyl amines when combined with stearic acid and zinc oxide, react therewith to form homogeneous waxy materials that are especially useful in compounding recipes because of the ease with which they blend with the elastomer on the mill, and said reaction products do not detract from the efficacy of the cyanoalkyl amine as a curing aid.

The advantages obtained on compounding, curing, and testing of the elastomer vulcanizates prepared with the materials of the present invention are more readily apparent by reference to the tables of data hereinafter.

The numerous examples set forth herein show the broad ranges of amines, cyanoalkyl-substituents, polymeric sources of acidic groups, and natural and synthetic elastomers to which the invention is applicable, and are set forth in tabular form for convenience and brevity. Brief comments accompany each table, and to afford an index thereto, the tables are here listed, with note of the amines employed and the elastomers treated therein, asterisks (*) being suffixed to the tables in this list that contain data showing the flat cure obtained with the N-(alpha-cyanoalkyl)-substituted amines, and especially with the N-(alpha-cyanoalkyl)-substituted polyamines. In this list and the tabulated examples, various reinforcing fillers are employed, e.g. carbon black, various vinylic fillers and, in Tables 28–32, various other reinforcing fillers, and it will be appreciated that the invention in its broader aspect is not dependent on the use of any particular species of reinforcing filler. As hereinbefore noted, the various vinylic fillers used in some of the examples are prepared by methods set forth in the aforesaid copending applications, and as set forth in these applications, the vinylic fillers are insoluble, colloidal sized, cross-linked polymer particles which are obtained by cross-linking polymerization in aqueous dispersion of ethylenically unsaturated monomer material essentially comprising, and polymerizable through, at least two ethenoid groups in non-conjugated relation.

| Table | Amine | Elastomer |
| --- | --- | --- |
| 3 | Cyanoalkyl-mono | Non-acidic, carbon black, GR-S. |
| 4 | do | Non-acidic, non-polar vinylic filler, GR-S. |
| 5 | do | Non-acid, polar vinylic filler, GR-S. |
| 6 | Unsubstituted | Acidic vinylic filler, GR-S (peaked cure). |
| 6A | Cyanoalkyl-monoalkyl | Do. |
| 7 | do | Do. |
| 8 | Cyanoalkyl plus radical other than alkyl-mono. | Do. |
| 9* | Unsubstituted and cyanoalkyl. | Do. |
| 10* | α- and β-cyanoalkyl-mono. | Do. |
| 11 | Cyanoalkyl-mono | Carbon black, GR-S, polyacid stock. |
| 12 | Cyanoalkyl-poly- | Acidic vinylic filler, GR-S stock. |
| 13* | α-Cyanoalkyl-poly- | Eight different acidic vinylic fillers, GR-S, stock. |
| 14* | do | Acidic vinylic filler, GR-S, stock. |
| 15 | 1 and 2 (α-cyanoalkyl)-poly-. | Do. |
| 16* | α-Cyanoalkyl mixed poly-. | Do. |
| 17 | Further cyanoalkyl-mixed poly. | Do. |
| 18 | Other α-cyanoalkyl-poly-. | Do. |
| 19 | 1 to 5 (α-cyanoalkyl-poly-. | Do. |
| 20 | 1 and 2 (α-cyanoalkyl-oxyalkyl-. | Do. |
| 21 | 2 and 4 (α-cyanoalkyl)-alkyl-di-. | Do. |
| 22 | α-Cyanoalkyl | Six acidic vinylic fillers, GR-S stock recipes. |
| 23 | Waxy compound of-α-cyanoalkyl. | Acidic vinylic fillers, GR-S stock. |
| 24 | Other α-cyanoalkyl-poly-. | Do. |
| 25* | Cyanoalkyl-poly- | Polyacid, grafted GR-S, carbon black stock. |
| 26 | do | Polyacid, grafted, GR-S, acid vinylic filler, carbon black, stock. |
| 27 | do | Various polyacid, GR-S, filler, stocks. |
| 28–33 | do | GR-S stocks with various fillers. |
| 33A | | Table to show that polyacid alone does not improve such stocks. |
| 34 | Cyanoalkyl | Acid elastomer stock. |
| 35* | do | Acid elastomer and acid vinylic filler stocks. |
| 36 | do | Neoprene, acid vinylic filler stocks. |
| 37 | do | Natural rubber, non-polar vinylic filler stocks. |
| 38 | do | Nitrile rubber, acid vinylic filler stock. |
| 3A | Cyanoalkyl poly- | GR-S 1500 and carbon black. |
| 8A | Cyanoalkyl mono- and poly- with tertiary nitrogen. | Acidic vinylic filler, GR-S stock. |
| 8B | Cyanoalkyl poly- with tertiary nitrogen. | Do. |
| 10A | Cyanoalkyl poly- | Do. |
| 23A | Resinous compounds of cyanoalkyl poly-. | Do. |
| 24A | Cyanoalkyl poly- | Do. |
| 27A | do | Do. |
| 39 | Cyanoalkyl mono- and poly-. | Aging of GR-S 1500 stocks. |

*Table 1*

CYANOALKYL AMINES

| Typical Example | Moles, Cyanohydrin | Amine, 1 mol | Abbreviations | Product |
| --- | --- | --- | --- | --- |
| 1-1 | Lactonitrile, 1 | Isopropyl amine | 1-IP [1] | Yield 94% colorless liquid B.P. 67-68° C. 25 mm. Hg. |
| 1-2 | do | do | 2-IP | Colorless liquid. |
| 1-3 | do | Diisopropyl amine | 1-DIP | Do. |
| 1-4 | do | t-Butylamine | 1-TB | Yield 92% colorless liquid. |
| 1-5 | do | t-Octylamine | 1-TO | Yield 70% colorless liquid B.P. 76-78° C. 35 mm. Hg. |
| 1-6 | do | Allyl amine | 1-AL | Yield 91% colorless liquid B.P. 65-67° C. 12 mm. Hg. |
| 1-7 | do | Cyclohexyl amine | 1-CH | Yield 94% colorless liquid B.P. 96-99° C. 13 mm. Hg. |
| 1-8 | do | tert-C12–15 primary amines | 1-T 12/15 | Brown-yellow liquid. |
| 1-9 | do | tert-18–24 primary amines | 1-T 18/24 | Do. |
| 1-10 | do | Rosinamine D | 1-RA | Yellow, very viscous mass. |
| 1-11 | do | N-aminopropyl morpholine | 1-APM | High boiling brown liquid. |
| 1-12 | do | Furfuryl amine | 1-FU | Colorless liquid B.P. 123° C. 23 mm. Hg. |
| 1-13 | do | Aniline | 1-AN | Solid. |
| 1-14 | Lactonitrile, 3 | Ethanolamine | 3-EA | Viscous liquid. |
| 1-15 | Lactonitrile, 1 | Morpholine | 1-MO | Fluid liquid. |
| 1-16 | do | Beta-isopropylamino-propionitrile | β-IPL | Crystalline. |
| 1-17 | do | Beta-beta-iminobis propionitrile | 1-IBPN | Fluid. |
| 1-18 | Lactonitrile, 3 | Ammonia | 3-N | Crystalline. |
| 1-19 | Lactonitrile, 1 | Alpha-alpha-imino bispropionitrile | α-IBPN | Do. |

[1] Referred to as Amitrile-I.P.

Table 2
CYANOALKYL POLYAMINES

| Typical Example | Moles, Cyanohydrin | Amine, 1 mole | Abbreviations | Product |
|---|---|---|---|---|
| 2-1 | Lactonitrile, 1 | Diethylenetriamine | 1-DETA | Colorless liquid B.P. about 65°C. 1 mm. Hg. |
| 2-2 | Lactonitrile, 2 | do | 2-DETA | Colorless liquid B.P. 70-100°C. 1 mm. Hg. |
| 2-3 | Lactonitrile, 3 | do | 3-DETA | Viscous yellow-brown liquid. |
| 2-4 | Lactonitrile, 4 | do | 4-DETA | Very viscous yellow-brown liquid. |
| 2-5 | Lactonitrile, 5 | do | 5-DETA | Do. |
| 2-6 | Lactonitrile, 1 | Triethylenetetramine | 1-TETA | Yellow-brown liquid not distillable. |
| 2-7 | Lactonitrile, 2 | do | 2-TETA | Do. |
| 2-8 | Lactonitrile, 1 | Tetraethylenepentamine | 1-TEPA [1] | Do. |
| 2-9 | Lactonitrile, 2 | do | 2-TEPA | Do. |
| 2-10 | Lactonitrile, 3 | do | 3-TEPA [2] | Do. |
| 2-11 | Lactonitrile, 1 | Mixed polyethylenepolyamines [4] | 1-MPAH [3] | Brown viscous liquid. |
| 2-12 | do | do [5] | 1-MPAD | Dark brown viscous liquid. |
| 2-13 | Lactonitrile, 4 | do [6] | 4-MPAD | Do. |
| 2-14 | Lactonitrile, 1 | Iminobispropylamine | 1-IBPA | Yellow liquid 75% distills 60-80° C. 1 mm. Hg. |
| 2-15 | Lactonitrile, 2 | do | 2-IBPA | Yellow liquid. |
| 2-16 | Lactonitrile, 1 | Ethylenebisoxypropylamine | 1-EBOP | Do. |
| 2-17 | Lactonitrile, 2 | do | 2-EBOP | Do. |
| 2-18 | do | Hexamethylenediamine | 2-HMDA | Yellow brown liquid, partly crystallized. |
| 2-19 | Lactonitrile, 4 | do | 4-HMDA | Yellow-brown viscous liquid. |
| 2-20 | Lactonitrile, 1 | N-octyl-2-benzidine | 1-NO2B | Solid dark. |
| 2-21 | do | N,N-di-sec-butyl-p-phenylenediamine | 1-DBPD | Dark viscous mass. |
| 2-22 | Lactonitrile, 2 | do | 2-DBPD | Do. |
| 2-23 | Lactonitrile, 1 | Benzidine | 1-B | Dark solid. |
| 2-24 | Lactonitrile, 2 | do | 2-B | Do. |
| 2-25 | Lactonitrile, 1 | m-Phenylenediamine | 1-MPDA | Do. |
| 2-26 | Lactonitrile, 2 | do | 2-MPDA | Do. |
| 2-27 | Lactonitrile, 1 | p-Phenylenediamine | 1-PPDA | Do. |
| 2-28 | Lactonitrile, 2 | do | 2-PPDA | Do. |
| 2-29 | Acetophenone cyanohydrin, 2 | Tetraethylenepentamine | 2-ACP | Viscous liquid. |
| 2-30 | Methylisopropenylketone cyanohydrin, 5. | Diethylenetriamine | 5-MIPK | Very viscous liquid. |
| 2-31 | Lactonitrile, 4 | Mixed polyethyleneamines [6] | 4-PAT [7] | Dark brown, very viscous. |
| 2-32 | Acetone cyanohydrin, 1 | Tetraethylenepentamine | 1-AC | Viscous liquid. |
| 2-33 | Acetone cyanohydrin, 2 | do | 2-AC | Do. |
| 2-34 | | Saponified 2-TEPA (2-9) | | Very viscous. |
| 2-35 | Glyconitrile, 2 | Tetraethylenepentamine | 2G-TEPA | |
| 2-36 | do | Diethylenetriamine | 5G-TEPA | |

[1] Referred to as Amitrile A-1.
[2] Referred to as Amitrile T3.
[3] Referred to as Amitrile H.
[4] "Polyamine H special" from Carbide and Carbon Chemical Co.
[5] "Residue Polyamines" from Dow Chemical Co.
[6] "Polyamine T" from Carbide and Carbon Chemical Co.
[7] Referred to as Amitrile PAT.

In Tables 3 through 39, the compositions of the compounds are based on parts per hundred of elastomer. The tensile properties were obtained at 77° F. with a Scott Tensile Tester (Model ORR-5), the heat build-up values were obtained with a Goodrich Flexometer at 100° F. and the hardness values were obtained with a Shore A durometer at 77° F.

Turning now to the specific examples, in Table 3 a non-acid carbon black stock is compounded without amine, as a control, and with two different cyanoalkyl-substituted amines. The GR-S 1500 plus 50 parts of the non-acid carbon black, Philblack "O," is equivalent to GR-S 1600, which already contains said proportions of such carbon black. Each of the cited examples is that one of a group of examples cured to optimum tensile strength (see for example Table 9 and other tables in which several curing times are set forth to show flatness of cure). The examples of Table 3 show not only improvement in tensile values, but a marked improvement in elongation as compared with the control, and also show a marked reduction in heat build-up under flexure of the cured elastomer.

In Table 3a it is illustrated that the tensile strength of a 25 pt. carbon black stock can be improved by the use of a cyanoalkyl persubstituted polyamine. Tensile values as high as 3510 p.s.i. were obtained in Example 3a-2, which represents a 35% increase over the control 3a-1.

The addition of the cyanoalkylated polyamine to the uncured GR-S 1500 or 1600 stock has another remarkable effect. GR-S stocks are characterized by the lack of tack. When these cyanoalkylated amines are added in amounts from 0.5 to 5 pts. per 100 pts. of polymer, the stock becomes tacky without being too soft for tire building. This property of tackifying GR-S stocks is an important characteristic of the cyanoalkylated polyamines.

Table 3

IMPROVEMENT OF VULCANIZATION OF NON-ACIDIC CARBON BLACK ELASTOMER STOCKS BY CURING WITH CYANOALKYLATED MONO- AND POLYAMINES

| Example No. | 3-1 Control | 3-2 | 3-3 |
|---|---|---|---|
| Compound No., B- | 17411 | 18480 | 18481 |
| Elastomer: | | | |
| GR-S 1500 | 100 | | |
| GR-S 1600 [1] | | 150 | 150 |
| Philblack "O" [2] | 50 | | |
| Cyanoalkyl amine (Example No.): | | | |
| Mono-I-IP (1-1) | | 1 | |
| Poly-3-TEPA | | | 1 |
| AgeRite Resin D [3] | 1 | 1 | 1 |
| Zinc oxide | 3 | 3 | 3 |
| Circo Para [4] | 5 | 5 | 5 |
| Santocure [5] | 1 | 1 | 1 |
| Sulfur | 1.75 | 1.75 | 1.75 |
| Mooney viscosity, ML-4 | 69 | 63 | 66 |
| Cure at 285° F., min | 120 | 90 | 90 |
| Elongation, percent | 500 | 585 | 575 |
| 300% modulus, p.s.i | 1,970 | 1,845 | 1,505 |
| Tensile, p.s.i | 3,539 | 3,780 | 3,625 |
| Hardness | 67 | 67 | 67 |
| Heat build-up, ° F | 86 | 65 | 68 |
| Increase in tensile strength, percent | | 7 | 3 |
| Increase in elongation, percent | | 17 | 15 |

[1] GR-S 1500 + 50 pts. Philblack "O" is equivalent to GR-S 1600.
[2] Philblack "O" is a non-acid carbon black sold by Phillips Petroleum Company.
[3] AgeRite Resin D is the antioxidant polymerized trimethyldihydroquino-line sold by R. T. Vanderbilt Company.
[4] Circo Para is a mixture of 50 pts. of Circosol 2XH from Sun Oil Company and 50 pts. of Para Flux 2016 from C. P. Hall Company.
[5] Santocure is N-cyclohexyl-2-benzothiazol sulfenamide sold by Monsanto Chemical Company.

Table 3a

IMPROVEMENT OF VULCANIZATION OF NON-ACIDIC PTS. CARBON BLACK-ELASTOMER STOCKS BY CURING WITH A CYANOALKYL-PERSUBSTITUTED POLYAMINE

| Example No. | 3a-1 | 3a-2 |
|---|---|---|
| Compound No., B- | 421 | 19407 |
| Elastomer and Filler: | | |
| GR-S 1600 [1] | | 75 |
| GR-S 1500 | 100 | 50 |
| Philblack "O" [2] | 25 | |
| Cyanoalkyl amine (Example No.): 5 DETA (2-5) | | 2 |
| Stearic acid | 1 | 1 |
| Zinc oxide | 3 | 3 |
| AgeRite Resin D [3] | 1 | 1 |
| Para Flux 2016 [4] | 5 | 5 |
| Santocure [5] | 1 | 1 |
| A-32 [6] | 0.20 | 0.20 |
| Sulfur | 2.5 | 2.5 |
| Mooney viscosity, ML-4 | 44 | 41 |
| Cure at 285° F., min | 90 | 60 |
| 300% modulus, p.s.i | 1,250 | 515 |
| Shore hardness | 44 | 62 |
| Tensile, p.s.i | 2,600 | 3,510 |
| Increase in tensile strength, percent | | 35 |

NOTE.—For footnotes 1 through 5 see Table 3.

[6] A-32 is a reaction product of butyraldehyde with butylidene aniline sold by Monsanto Chemical Company.

Table 4 shows that the cyanoalkylated mono- and polyamines of this invention remarkably improve the tensile values of vulcanizates of non-acid non-polar vinylic filler, GR-S, stocks.

The N-cyanoalkyl-substituted monoamine increased the tensile value about 23%, while the cyanalkylated polyamine increased it 46%.

Table 4

IMPROVEMENT OF VULCANIZATION OF NON-ACID, NON-POLAR, VINYLIC FILLER-ELASTOMER STOCKS WITH CYANOALKYLATED MONO- AND POLAMINES

| Example No. | 4-1 | 4-2 | 4-3 |
|---|---|---|---|
| Compound No., B- | 8443 | 18482 | 18483 |
| Elastomer: GR-S 1500 | 100 | 100 | 100 |
| Filler: S/DVB (90/10) [7] | 20 | 20 | 20 |
| Cyanoalkyl amine (Example No.): | | | |
| Mono-1-IP (1-1) | | 1 | |
| Poly-3-TEPA (2-10) | | | 1 |
| Zinc oxide | 3 | 3 | 3 |
| AgeRite Resin D [3] | 1 | 1 | 1 |
| Stearic acid | 1 | 1 | 1 |
| Santocure [5] | 1 | 1 | 1 |
| Sulfur | 2.5 | 2.5 | 2.5 |
| Mooney, ML-4 | 50 | 45 | 47 |
| Cure at 285° F | 90 | 20 | 60 |
| Elongation, percent | 635 | 915 | 750 |
| 300% Modulus, p.s.i | 400 | 165 | 340 |
| Tensile, p.s.i | 2,275 | 2,725 | 3,220 |
| Hardness | 60 | 57 | 63 |
| Heat build-up, ° F | | 42 | 49 |
| Increase in tensile strength, percent | | 19 | 41 |

NOTE.—For footnotes 3 and 5 see Table 3.

[7] Colloidal sized emulsion copolymer of styrene-divinylbenzene, (90/10) combined with elastomer by cocoagulation.

Table 5 shows that elastomers reinforced with polar vinylic fillers are improved by curing with cyanoalkylamines in accordance with the present invention. In the control, Example 5-1, and Example 5-2, employing carbonyl (ketone) vinylic filler, the cyanoalkylamines improved the tensile value 40%. In Examples 5-3 to 5-5 the carbonyl groups (aldehyde) were supplied by the methacrolein and acrolein components of the vinylic filler, which have substantially the same effect as when supplied by ketone components thereof. The N-tri-(propionitrile)-tetraethylene pentamine improved the tensile strength 34%, and these three examples, at 60 to 75 minutes' cure (the last with more of the cyanoalkylamine) show the extremely flat nature of the cure obtained with the N-poly-α-cyanoalkylated polyamine, and that variations in the small quantity of the cyanoalkylamine used are not highly critical. Example 5-7, with its control 5-6, shows that with the active carbonyl groups supplied by acrolein in the vinylic filler, the addition of one part of the N-poly-alpha-cyanoalkylated polyamine produced a 46% increase in tensile strength.

Table 5

IMPROVEMENT OF VULCANIZATION OF NON-ACIDIC, POLAR VINYLIC FILLER, ELASTOMER STOCKS BY CURING WITH CYANOALKYLATED MONO- AND POLYAMINES

| Example No. | 5-1 | 5-2 | 5-3 | 5-4 | 5-5 | 5-6 | 5-7 |
|---|---|---|---|---|---|---|---|
| Compound No., B- | 16491 | 16492 | 17487 | 18402 | 18403 | 17486 | 17485 |
| Elastomer (GR-S 1500) | 100 | 100 | 100 | 100 | 100 | 100 | 100 |
| Vinylic filler: | | | | | | | |
| S/DVB/MIPK [8] | 20 | 20 | | | | | |
| S/DVB/MAC [9] | | | 20 | 20 | 20 | | |
| S/DVB/AC [10] | | | | | | 20 | 20 |
| Cyanoalkylamine (Example No.): | | | | | | | |
| Mono-poly 1-TEPA (2-8) | | 1 | | | | | |
| Poly-poly 3-TEPA (2-10) | | | 1 | 1 | 2 | | 1 |
| Stearic acid | 1 | 1 | 1 | 1 | 1 | 1 | 1 |
| AgeRite Resin D [3] | 1 | 1 | 1 | 1 | 1 | 1 | 1 |
| Zinc oxide | 3 | 3 | 3 | 3 | 3 | 3 | 3 |
| Santocure [5] | 1 | | 1 | 1 | 1 | 1 | 1 |
| Altax [11] | | 1 | | | | | |
| Sulfur | 2.5 | 2.5 | 2.5 | 2.5 | 2.5 | 2.5 | 2.5 |
| Compound Mooney, ML-4 | 58 | 81 | 54 | 64 | 71 | 55 | 62 |
| Cure at 285° F., min | 60 | 45 | 60 | 75 | 75 | 105 | 60 |
| Elongation, percent | 765 | 750 | 760 | 735 | 800 | 775 | 815 |
| 300% modulus, p.s.i | 210 | 465 | 340 | 380 | 360 | 240 | 285 |
| Tensile, p.s.i | 2,365 | 3,435 | 3,280 | 3,210 | 3,260 | 1,970 | 2,880 |
| Hardness | 60 | 63 | 63 | 66 | 64 | 62 | 62 |
| Tensile strength increase, percent | | 45 | | | | | 46 |

NOTE.—For footnotes 3 and 5 see Table 3.

[8] Colloidal sized emulsion copolymer of styrene/divinylbenzene/methylisopropenyl ketone (70/10/20).
[9] Colloidal sized emulsion copolymer of styrene/divinylbenzene/methacrolein (80/10/10).
[10] Colloidal sized emulsion copolymer of styrene/divinylbenzene/acrolein (80/10/10).
[11] Altax is benzothiaryl disulfide sold by R. T. Vanderbilt Co., Inc.

Table 6 is submitted for comparison purposes. Cure of substantially the same stock with an unsubstituted amine, as disclosed in Burke application S.N. 378,735, filed September 8, 1953, effects a marked improvement in tensile value, but the cure is sharply peaked. Furthermore, on storage of this compounded stock before curing, the benefit of the amine is partially lost, as shown (almost 760 p.s.i. lower tensile strength being obtained). Likewise heat aging of the cured stocks initially containing the unsubstituted amine showed a considerable loss of tensile properties.

Table 6

SHARPLY PEAKED CURE OF ELASTOMER AND VINYLIC FILLER STOCK WITH A VOLATILE AMINE AND LOSS OF BENEFIT THROUGHOUT STORAGE

| Example No. | 6-1 Control | 6-2 |
|---|---|---|
| Compound No., B- | 2486 | 2430 |
| Elastomer (GR-S 1500) | 100 | 100 |
| Vinylic filler: S/DVB/MAA [12] | 20 | 20 |
| Volatile amine (allyl amine) | | 3 |
| Captax [13] | 0.5 | |
| Zinc oxide | 5 | 3 |
| Ethyl Tuads [14] | 0.15 | |
| Stearic acid | 1 | 2 |
| Altax [11] | 1 | |
| Santocure [5] | | 1 |
| 25% A-32 Masterbatch [15] | | 0.8 |
| Sulfur | 2.5 | 2.5 |
| Compound Mooney, ML-4 | 50 | 46 |
| Cure* at 285° F., min | 90 | 20 |
| Elongation, Percent | 815 | 815 |
| 300% modulus, p.s.i | 160 | 375 |
| Tensile, p.s.i | 1,055 | 3,725 |
| Hardness | 50 | 46 |

*See the following table:

| Cure, min. at 285° F. | P.s.i. tensile strength | Percent elong. | S-300% | Hardness |
|---|---|---|---|---|
| 15 | 3,085 | 890 | 275 | 60 |
| 20 | 3,725 | 815 | 375 | 63 |
| 30 | 3,415 | 750 | 440 | 64 |
| 60 | 3,320 | 700 | 465 | 64 |
| 75 | 3,015 | 700 | 465 | 66 |

Table 6—Continued

After compounding, storage for seven days before curing resulted in the following maxima

| 45 | 3,015 | 740 | 430 | 59 |

Similarly 37 days' storage prior to curing gave the following results

| 30 | 2,250 | 710 | 480 | 56 |

Aging of the cured stock (cured immediately after compounding) gave the following results

| 30 | 1,505 | 415 | 915 | 68 |

NOTE.—For footnote 5 see Table 3, footnote 11 see Table 5.
[12] Colloidal sized emulsion copolymer of styrene/divinylbenzene/methacrylic acid (80/10/10).
[13] 2-mercaptobenzothiazole.
[14] Tetramethylthiuramdisulfide.
[15] A-32(7) milled into GR-S 1500.

Table 7 shows that a variety of alpha-N-substituted propionitriles can be used as curing aids for GR-S 1500 reinforced with acidic vinylic fillers.

Shown are the results from the reaction products of 1 mol. lactonitrile with 1 mol diisopropyl amine (7–2) tert-butyl amine (7–3) tert-octyl amine (7–4) and allylamine (7–5). Increases of tensile strength from 153 to 182% are observed.

Table 7

COMPARISON OF IMPROVEMENTS EFFECTED BY FOUR DIFFERENT α-CYANOALKYLATED MONO-AMINE IN SAME ELASTOMER-ACID VINYLIC FILLER STOCK

| Example No. | 7-1 Control | 7-2 | 7-3 | 7-4 | 7-5 |
|---|---|---|---|---|---|
| Compound No., B- | 2486 | 2479 | 2480 | 2481 | 2478 |
| Elastomer (GR-S 1500) | 100 | 100 | 100 | 100 | 100 |
| Vinylic filler: S/DVB/MAA (80/10/10) [12] | 20 | 20 | 20 | 20 | 20 |
| Cyanoalkylamine (Example No.): | | | | | |
| 1-DIP (1-3) | | 5 | | | |
| 1-TB (1-4) | | | 4 | | |
| 1-TO (1-5) | | | | 6 | |
| 1-AL (1-6) | | | | | 4 |
| PBNA [17] | 1 | 1 | 1 | 1 | 1 |
| Zinc oxide | 5 | 3 | 3 | 3 | 3 |
| Stearic acid | 1 | 2 | 2 | 2 | 2 |
| Santocure [5] | | 1 | 1 | 1 | 1 |
| 25 percent A-32 Masterbatch [15] | | 0.8 | 0.8 | 0.8 | 0.8 |
| Captax [13] | 0.5 | | | | |
| Altax [11] | 1 | | | | |
| Ethyl tuads [14] | 0.15 | | | | |
| Sulfur | 2.5 | 2.5 | 2.5 | 2.5 | 2.5 |
| Compound Mooney ML-4 | 50 | 56 | 49 | 46 | 49 |
| Cure at 285° F., min | 90 | 90 | 90 | 90 | 75 |
| Elongation, Percent | 815 | 800 | 755 | 790 | 850 |
| 300% modulus, p.s.i | 160 | 380 | 435 | 310 | 360 |
| Tensile, p.s.i | 1,055 | 2,765 | 2,980 | 2,825 | 2,670 |
| Hardness | 50 | 62 | 62 | 57 | 58 |
| Increase in tensile strength, percent | | 163 | 182 | 168 | 153 |

NOTE.—For footnote 5 see Table 3, footnote 11, see Table 5, footnotes 12, 13, 14, and 15 see Table 6.
[17] Phenyl-beta-naphthylamine.

Table 8 gives further examples of the improvement based on different specific cyanoalkylated monoamines. It will be observed that in Examples 8–2 to 8–5 substantially the same increase of tensile strength was obtained as in Table 7, namely, in the range of 150% to 180% increase, and that in Example 8–6 in which the acid vinylic filler was cross-linked with tri-acrylylperhydro triazine, a tensile increase of 223% was obtained with the cyanoalkylated phenylamine.

Table 8

IMPROVEMENT OF VULCANIZATION OF VINYLIC FILLER-ELASTOMER STOCKS BY CURING WITH VARIOUS MONO-CYANOALKYLATED MONOAMINES

| Example No. | 8-1 Control | 8-2 | 8-3 | 8-4 | 8-5 | 8-6 |
|---|---|---|---|---|---|---|
| Compound No., B- | 2486 | 3490 | 3491 | 3497 | 10444 | 10468 |
| Elastomer (GR-S 1500) | 100 | 100 | 100 | 100 | 100 | 100 |
| Vinylic Filler: | | | | | | |
| S/DVB/MAA [12] | 20 | 20 | 20 | 20 | 20 | |
| S/TAHT/MAA [18] | | | | | | 2 |
| Cyanoalkylamine (Example No.): | | | | | | |
| 1-T12-15 (1-8) | | 5 | | | | |
| 1-T18-24 (1-9) | | | 5 | | | |
| 1-FU (1-12) | | | | 4 | | |
| 1-CH (1-7) | | | | | 2 | |
| 1-AN (1-13) | | | | | | 2 |
| PBNA [17] | | | | | | 0.5 |
| AgeRite Resin D | | | | | 1 | 1 |
| Zinc oxide | 5 | 3 | 3 | 3 | 3 | 3 |
| DPG [19] | | | | | | 0.5 |
| Stearic acid | 1 | 2 | 2 | 2 | 1 | 1 |
| Altax [11] | 1 | | | | | |
| Santocure [5] | | 1 | 1 | 1 | 1 | 1 |
| A-32 24% Mastervatch [15] | | 0.8 | 0.8 | 0.8 | | |
| Ethyl tuads [14] | 0.15 | | | | | |
| Sulfur | 2.5 | 2.5 | 2.5 | 2.5 | 2.5 | 2.5 |
| Mooney, ML-4 | 50 | 43 | 12 | 53 | 40 | 53 |
| Cure at 285° F., min | 90 | 90 | 75 | 60 | 30 | 150 |
| 300% modulus, p.s.i | 160 | 370 | 270 | 425 | 225 | 395 |
| Elongation, percent | 815 | 770 | 800 | 745 | 815 | 765 |
| Tensile, p.s.i | 1,055 | 2,745 | 2,740 | 2,640 | 2,960 | 3,370 |
| Hardness | 50 | 63 | 58 | 65 | 62 | 66 |
| Increase in tensile strength, percent | | 160 | 160 | 150 | 180 | 223 |

NOTE.—For footnote 5 see Table 3, footnote 11 see Table 5, footnotes 11, 12, 14, and 15 see Table 6, footnote 17 see Table 7.
[18] S/TAHT/MAA is a colloidal sized emulsion polymer of styrene/tri-acrylylhexahydrotriazine/methacrylic acid (84/6/10).
[19] DPG is diphenylguanidine, an accelerator.

In Table 8a four other examples are given for cyanoalkylated monoamines. These examples represent a group of amines in which the nitrogen is tri-substituted so that it is tertiary. All these cyanoalklated monoamines are effective in the vulcanization of acidic GR-S 1500 stocks. Dicyanoalkylisopropyl amine (Example 8a–5) showed the highest increase in tensile strength (190%) over that of the control. The persubstituted ethanolamine (Example 8a–2) is the least effective from this group, although it increases the tensile strength 150% over the control.

Table 8a

EFFECT OF MONO- AND POLY-CYANOALKYLATED MONOAMINES ON VULCANIZATION OF GR-S 1500 STOCKS CONTAINING ACID VINYLIC FILLERS

| Example No. | 8a-1 | 8a-2 | 8a-3 | 8a-4 | 8a-5 |
|---|---|---|---|---|---|
| Compound No., B- | 2486 | 19439 | 19440 | 19442 | 19443 |
| Elastomer (GR-S 1500) | 100 | 100 | 100 | 100 | 100 |
| Vinylic filler: | | | | | |
| S/DVB/MAA [12] | 20 | 20 | 20 | 20 | |
| S/DVB on S/MAH [27] | | | | | 20 |
| Cyanoalkylamine (Example No.): | | | | | |
| 3-EA (1-14) | | 1 | | | |
| 1-MD (1-15) | | | 1 | | |
| 2-IPL (1-16) | | | | 1 | |
| 2-IP (1-2) | | | | | 1 |
| AgeRite Resin D [3] | | 1 | 1 | 1 | 1 |
| Zinc oxide | 5 | 3 | 3 | 3 | 3 |
| Captax [13] | 0.5 | | | | |
| Altax [11] | 1 | | | | |
| Ethyl tuads [14] | 0.15 | | | | |
| Santocure [5] | | 1.5 | 1.5 | 1.5 | 1.5 |
| Stearic acid | 1 | 1 | 1 | 1 | 1 |
| Sulfur | 2.5 | 2.5 | 2.5 | 2.5 | 2.5 |
| Compound Mooney, ML-4 | 50 | 46 | 48 | 50 | 49 |
| Cure at 285° F., min | 90 | 150 | 75 | 90 | 30 |
| Elongation, percent | 815 | 715 | 725 | 640 | 825 |
| 300% modulus, p.s.i | 160 | 375 | 385 | 375 | 315 |
| Tensile, p.s.i | 1,055 | 2,635 | 2,890 | 2,805 | 3,055 |
| Hardness | 50 | 68 | 70 | 72 | 64 |
| Increase in tensile strength, percent | | 150 | 170 | 165 | 190 |

NOTE.—For footnotes 3 and 5 see Table 3, footnote 11 see Table 5, footnotes 12, 13, and 14 see Table 6, footnote 27 see Table 13.

In Table 8b two examples are given for amines in which all the available hydrogens of the amino group are substituted with cyanoalkyl groups. A member of this group is represented in Example 8b–2 by alpha-beta-betatricyanoethylamine and in Example 8b–3 by tricyanomethylamine. Both are effective as curing aids. Tricyanomethylamine tri-alpha-, alpha-, beta-cyanopropylamine are less effective probably due to the presence of the cyano groups close to the nitrogen. However, tensile strength increases up to 164% are observed.

*Table 8b*

EFFECT OF TWO DIFFERENT POLYCYANOALKYLATED AMINES ON VULCANIZATION OF GR-S 1500 STOCKS CONTAINING ACIDIC VINYLIC FILLERS

| Example No | 8b-1 Control | 8b-2 | 8b-3 | 8b-4 |
|---|---|---|---|---|
| Compound No., B- | 2486 | 19473 | 19495 | 19496 |
| Elastomer (GR-S 1500) | 100 | 100 | 100 | 100 |
| Vinylic filler: | | | | |
| S/DVB/MAA (80/10/10) [12] | 20 | | | |
| VT/DVB (95/5) on S/MAH [23] | | 20 | 20 | 20 |
| Cyanoalkylamine (Example No.): | | | | |
| 1-IBPN (1-17) | | 1 | | |
| 3-N (1-18) | | | 1 | |
| α-IBPN (1-19) | | | | 1 |
| Stearic acid | 1 | 1 | 1 | 1 |
| AgeRite Resin D [3] | | 1 | 1 | 1 |
| Zinc oxide | 5 | 3 | 3 | 3 |
| Altax | 1 | 1 | 1 | 1 |
| Captax [13] | 0.5 | | | |
| Ethyl tuads [14] | 0.15 | | | |
| DPG [19] | | 0.2 | 0.2 | 0.2 |
| Sulfur | 2.5 | 2.5 | 2.5 | 2.5 |
| Compound Mooney, ML-4 | 50 | 49 | 56 | 52 |
| Cure at 285° F., min | 90 | 105 | 75 | 90 |
| Elongation, percent | 815 | 710 | 680 | 690 |
| 300% modulus, p.s.i | 160 | 455 | 500 | 455 |
| Tensile, p.s.i | 1,055 | 2,780 | 2,640 | 2,465 |
| Hardness | 50 | 67 | 64 | 66 |
| Increase in tensile strength, percent | | 164 | 150 | 134 |

NOTE.—For footnote 3 see Table 3, footnotes 12, 13, and 14 see Table 6, footnote 19 see Table 8, footnote 23 see Table 13.

Table 9: The comparison of the curing rates of N-aminopropyl morpholine with its reaction product with 1 mol lactonitrile shows the advantage of the use of a cyanoalkyl product. While the free amine shows a sharp peaked cure with a maximum tensile strength of 2990 p.s.i. at 60 minutes and 2350 p.s.i. at 90 minutes (Example 9–3) the cyanoalkylated amine gives a maximum tensile strength of 3100 p.s.i. at the 60 minutes and the tensile values drop only to 2800 in the 90 minutes' cure (Example 9–2).

*Table 9*

COMPARISON OF THE CURE RATES FOR FREE AMINE AND CYANOALKYL-SUBSTITUTED AMINE

| Example No | 9-1 Control | 9-2 | 9-3 |
|---|---|---|---|
| Compound No., B- | 2486 | 12486 | 12487 |
| Elastomer (GR-S 1500) | 100 | 100 | 100 |
| Vinylic filler (acidic): S/DVB/MAA [13] | 20 | 20 | 20 |
| Cyanoalkyl amine (Example No.): 1-APM (1-11) | | 1 | |
| Free amine: N-aminopropyl morpholine | | | 1 |
| Stearic acid | 1 | 1 | 1 |
| AgeRite Resin D [3] | | 1 | 1 |
| Altax [11] | 1 | | |
| Zinc oxide | 5 | 3 | 3 |
| Captax [13] | 0.5 | | |
| Santocure | | 1 | 1 |
| Ethyl tuads [14] | 0.15 | | |
| Sulfur | 2.5 | 2.5 | 2.5 |
| Mooney, ML-4 | 50 | 50 | 51 |
| Cure at 285° F., min | 90 | | |
| Elongation, percent | 815 | | |
| 300% modulus, p.s.i | 160 | | |
| Tensile, p.s.i | 1,055 | | |
| Hardness | 50 | | |
| Increase in tensile strength | | 194 | 182 |

| | Min. cure at 285° F. | p.s.i. tens. | p.s.i. 300% mod. | Elong. | Hardness |
|---|---|---|---|---|---|
| B-12486 | 60 | 3,100 | 810 | 250 | 64 |
| | 75 | 2,725 | 750 | 280 | 66 |
| | 90 | 2,800 | 735 | 285 | 67 |
| | 120 | 2,770 | 715 | 285 | 67 |
| B-12487 | 30 | (a) | (a) | (a) | (a) |
| | 45 | 1,415 | 775 | 170 | 64 |
| | 60 | 2,990 | 765 | 225 | 63 |
| | 90 | 2,350 | 640 | 335 | 67 |

NOTE.—For footnote 3 see Table 3, footnote 11 see Table 5, footnotes 13 and 14 see Table 6.
a Did not cure.

In Table 10 are compared four substituted propionitriles, namely beta, beta-iminobispropionitrile (1–2), beta-dimethylaminopropionitrile (10–3), beta-isopropylaminopropionitrile (1–4) and alpha-isopropylaminopropionitrile (10–5).

All four compounds are effective as curing aids for acid GR-S 1500 stocks with tensile strength increases of 120 to 160%. However, the outstanding properties of the alpha-substituted compound are demonstrated by the flat cure produced by the alpha-substituted propionitrile. From 45 to 105 minutes' cure time, the tensile values vary only from 2690 p.s.i. to 2845 p.s.i. with a high of 2965 at 60 minutes (Example 10–5). Especially remarkable are the tensile values after aging the cured samples at 212° F. for 48 hours. While the alpha-substituted propionitrile still shows a tensile strength of 2650 p.s.i. those of the beta-substituted product are as low as 1755 p.s.i.

Table 10a: In this table is demonstrated that the alpha, alpha-imino-bis-propionitrile can be used to advantage as a curing aid for acidic GR-S 1500 stocks. Of the 4 substituted propionitriles described in Table 10, the beta, beta-imino-bis-propionitrile is a heretofore well known chemical compound per se. The di-alpha-substituted compound (Table 10a) seems to be more effective in the curing system, since only 1 part is sufficient to give the same increase in tensile strength as obtained with the 4 pts. of the corresponding beta-substituted compound. In both compounds the increase of tensile strength was 135%.

*Table 10*

COMPARISON OF ALPHA- AND BETA-SUBSTITUTED AMINO PROPIONITRILES AND THE ADVANTAGES OF THE ALPHA-SUBSTITUTED PROPIONITRILE

| Example No | 10-1 Control | 10-2 | 10-3 | 10-4 | 10-5 |
|---|---|---|---|---|---|
| Compound No., B- | 2486 | 2438 | 2439 | 2440 | 2441 |
| Elastomer (GR-S 1500) | 100 | 100 | 100 | 100 | 100 |
| Vinylic filler (acidic): S/DVB/MAA [12] | 20 | 20 | 20 | 20 | 20 |
| Cyanoalkyl amines: | | | | | |
| Beta, beta-iminobispropionitrile | | 4 | | | |
| Beta - dimethylaminopropionitrile | | | 4 | | |
| Beta - isopropylaminopropionitrile | | | | 4 | |
| Alpha - isopropylaminopropionitrile | | | | | 4 |
| Zinc oxide | 5 | 3 | 3 | 3 | 3 |
| Altax [11] | 1.0 | | | | |
| Stearic acid | 1 | 2 | 2 | 2 | 2 |
| Santocure [5] | | 1 | 1 | 1 | 1 |
| 25% A-32 Masterbatch | | 0.8 | 0.8 | 0.8 | 0.8 |
| Sulfur | 2.5 | 2.5 | 2.5 | 2.5 | 2.5 |
| PBNA (AgeRite Powder) [17] | | 1 | 1 | 1 | 1 |
| Ethyl tuads [14] | 0.15 | | | | |
| Captax [13] | 0.5 | | | | |
| Compound Mooney, ML-4 | 50 | 49 | 50 | 50 | 53 |
| Cure at 285° F., min | 90 | 75 | 75 | 75 | 75 |
| Elongation, percent | 815 | 670 | 675 | 680 | 760 |
| 300% modulus, p.s.i | 160 | 402 | 384 | 378 | 359 |
| Tensile strength, p.s.i | 1,055 | 2,495 | 2,360 | 2,600 | 2,795 |
| Hardness | 50 | 64 | 63 | 63 | 64 |
| Increase in tensile strength, percent | | 130 | 120 | 140 | 160 |
| Properties after aging 48 hrs. at 212° F.: | | | | | |
| Tensile strength, p.s.i | | 1,970 | 2,040 | 1,755 | 2,650 |
| Elongation, percent | | 490 | 480 | 480 | 565 |

| Cure, min. at 285° F. | B-2438 | | B-2439 | | B-2440 | | B-2441 | |
|---|---|---|---|---|---|---|---|---|
| | P.s.i. | Elong. | P.s.i. | Elong. | P.s.i. | Elong. | P.s.i. | Elong. |
| 30 | 2,025 | 950 | | | | | | |
| 45 | | | | | | | 2,690 | 850 |
| 60 | 2,458 | 730 | 2,610 | 770 | 2,823 | 750 | 2,963 | 780 |
| 75 | 2,498 | 670 | 2,360 | 675 | 2,600 | 680 | 2,795 | 760 |
| 90 | 2,430 | 675 | 2,365 | 675 | 2,055 | 640 | 2,825 | 760 |
| 105 | 2,580 | 670 | 2,750 | 673 | 1,920 | 630 | 2,845 | 750 |

NOTE.—For footnote 5 see Table 3, footnote 11 see Table 5, footnotes 12, 13, and 14 see Table 6, footnote 17 see Table 7.

Table 10a
EFFECT OF ALPHA, ALPHA-IMINO-BIS-PROPIONITRILE ON VULCANIZATION OF ACIDIC GR-S 1500 STOCK

| Example No | 10a-1 | 10a-2 |
|---|---|---|
| Compound No., B- | 2486 | 19496 |
| Elastomer | 100 | 100 |
| Vinylic filler: | | |
| S/DVB/MAA [12] | 20 | |
| VT/DVB on S/MAH [23] | | 20 |
| Cyanoalkylated amine: Alpha, alpha-Imino-bis-propionitrile | | 1 |
| Zinc oxide | 5 | 3 |
| Altax [11] | 1 | 1 |
| Stearic acid | 1 | 1 |
| AgeRite Resin D [3] | | 1 |
| Captax [13] | 0.5 | |
| Ethyl tuads [14] | 0.15 | |
| DPG 25% MB [19] | | 0.8 |
| Sulfur | 2.5 | 2.5 |
| Compound Mooney, ML-4 | 50 | |
| Cure at 285° F., min | 90 | 90 |
| Elongation, percent | 815 | 690 |
| 300% modulus, p.s.i. | 160 | 470 |
| Tensile, p.s.i. | 1,055 | 2,490 |
| Hardness | 50 | 67 |
| Increase in tensile strength, percent | | 135 |

NOTE.—For footnote 3 see Table 3, footnote 11 see Table 5, footnotes 12, 13, and 14 see Table 6, footnote 19 see Table 8, footnote 23 see Table 13.

In Table 11 is demonstrated that the effectiveness of the cyanoalkylated amines is neither dependent on the source of the carboxyl groups nor on their amounts in the compounds. With increasing amounts of carboxyl groups, the amount of cyanoalkylated amine can be increased, however the amount is not very critical. As shown in Example 11-2 two parts of cyanoalkylated amine give 3885 p.s.i. tensile strength at an acid content of 0.756 pt. of polyacrylic acid, while in Example 11-4 four parts of cyanoalkylated amine, at an acid content of 0.375 pt. of polyacrylic acid yield a maximum tensile strength of 3665 p.s.i.

In Table 12 are compared three cyanoalkylated polyamines in GR-S 1500 stocks containing acidic vinylic fillers. One part of the cyanoalkylated amine is used in each compound. 12-2 contains one mole of tetraethylenepentamine reacted with one mole of lactonitrile, 12-3 the reaction product of one mole tetraethylenepentamine with two moles lactonitrile, and 12-4 represents the reaction product of one mole of the same amine with 3 moles lactonitriles. The tensile strengths are practically in the same range, between 3335 and 3500 p.s.i., which represents an increase from 215 to 230% over the tensile strength of the control. With the tri-substituted amine, the optimum tensile values are obtained at a slightly longer curing time, which is not considered serious since faster curing rates may be obtained by the use of a slightly higher amount of the cyanoalkylated amine.

In Table 13 it is demonstrated that the same monocyanoalkylated amine can be effective in 8 different GR-S 1500 stocks, containing acid vinylic fillers. The increases of tensile strength over that of the control lie between 200 and 240% (Example 13-3). The beneficial effect of the cyanoalkylated amine for the same source of carboxyl groups is independent of variations in the method of the preparation of the acid vinylic filler as shown in Examples 13-6 through 13-8. The optimum tensile values for the itaconic acid containing vinylic filler are between 3200 and 3460 p.s.i.

Table 11
COMPARISON OF THE EFFECT OF A CYANOALKYL-SUBSTITUTED MONOAMINE IN GR-S 1500 STOCK OF VARYING ACIDITY AND DIFFERENT SOURCES OF THE CARBOXYL GROUPS

| Example No | 11-1 Control | 11-2 | 11-3 | 11-4 | 11-5 |
|---|---|---|---|---|---|
| Compound No., B- | 18491 | 6471 | 6461 | 6470 | 6464 |
| Elastomer (GR-S 1500) | 100 | 100 | 100 | 100 | 100 |
| Source of polyacid | [20]S/MAH | [21]PAA | PAA | PAA | S/MAH |
| Parts | 2 | 0.756 | 1.51 | 0.375 | 2 |
| Philblack "O" [2] | 25 | 25 | 25 | 25 | 25 |
| Cyanoalkyl amine (Example No.): 1-IP (1-1) | | 2 | 3 | 4 | 3 |
| AgeRite Resin D [3] | 1 | | | | |
| Zinc oxide | 3 | 3 | 3 | 3 | 3 |
| Stearic acid | 2 | 2 | 2 | 2 | 2 |
| Santocure [5] | 1 | 1 | 1 | 1 | 1 |
| A-32 [7] | | 0.2 | 0.2 | 0.2 | 0.2 |
| Sulfur | 2.5 | 2.5 | 2.5 | 2.5 | 2.5 |
| Mooney, ML-4 | 50 | 52 | 47 | 49 | 49 |
| Cure at 285° F | 60 | 20 | 20 | 20 | 20 |
| Elongation, percent | 480 | 735 | 725 | 750 | 725 |
| 300% modulus, p.s.i. | 1,360 | 580 | 720 | 620 | 680 |
| Tensile, p.s.i. | 3,100 | 3,885 | 3,700 | 3,665 | 3,700 |
| Hardness | 62 | 62 | 61 | 62 | 60 |
| Increase in tensile strength, percent | | 25 | 19 | 18 | 19 |
| Properties at 212° F. for 48 hrs.: | | | | | |
| Tensile, p.s.i. | | 3,075 | 2,570 | 2,430 | 2,550 |
| Elongation, percent | | 410 | 380 | 360 | 380 |

NOTE.—For footnotes 2, 3, and 5 see Table 3, footnote 7 see Table 4.

[20] A styrene maleic anhydride copolymer.
[21] Polyacrylic acid.

Table 12
COMPARISON OF MONO- AND POLY-CYANOALKYLATED POLYAMINE IN AN ACIDIC FILLER CONTAINING GR-S 1500 STOCK

| Example No | 12-1 Control | 12-2 | 12-3 | 12-4 |
|---|---|---|---|---|
| Compound No., B- | 2486 | 11405 | 11412 | 17451 |
| Elastomer (GR-S 1500) | 100 | 100 | 100 | 100 |
| Vinylic filler (acidic): | | | | |
| S/DVB/MAA [12] | 20 | 20 | 20 | 20 |
| S/TAHT/MAA [18] | | | | 20 |
| Cyanoalkyl-polyamine (Example No.): | | | | |
| Mono-poly 1-TEPA (2-8) | | 1 | | |
| Poly-poly 2-TEPA (2-9) | | | 1 | |
| Poly-poly 3-TEPA (2-10) | | | | 1 |
| AgeRite Resin D [3] | | 1 | 1 | 1 |
| Zinc oxide | 5 | 3 | 3 | 3 |
| Altax [11] | 1 | | | |
| Stearic acid | 1 | 1 | 1 | 1 |
| Captax [13] | 0.5 | | | |
| Santocure [5] | | 1 | 1 | 1.5 |
| Ethyl tuads [14] | 0.15 | | | |
| Sulfur | 2.5 | 2.5 | 2.5 | 2.5 |
| Durez S-20092 [22] | | | 3 | |
| Mooney, ML-4 | 50 | 67 | 56 | 54 |
| Cure at 285° F., min | 90 | 105 | 105 | 120 |
| Elongation, percent | 815 | 750 | 740 | 815 |
| 300% modulus, p.s.i. | 160 | 440 | 450 | 340 |
| Tensile, p.s.i. | 1,055 | 3,500 | 3,455 | 3,335 |
| Shore hardness | 50 | 73 | 71 | 66 |
| Increase in tensile strength, percent | | 230 | 225 | 215 |

NOTE.—For footnotes 3 and 5 see Table 3, footnote 11 see Table 5, footnotes 12, 13, and 14 see Table 6, footnote 18 see Table 8.

[22] Durez S-20092 is a phenol resin from the Durez Plastics and Chemical Company, Inc.

Table 13
THE EFFECTIVENESS OF A MONO-CYANOALKYLATED POLYAMINE IN EIGHT DIFFERENT ACID STOCKS

| Example No | 13-1 Control | 13-2 | 13-3 | 13-4 | 13-5 | 13-6 | 13-7 | 13-8 | 13-9 |
|---|---|---|---|---|---|---|---|---|---|
| Compound No., B- | 2486 | 15480 | 15489 | 16342 | 16433 | 16434 | 16435 | 16436 | 14489 |
| Elastomer (GR-S 1500) | 100 | 100 | 100 | 100 | 100 | 100 | 100 | 100 | 100 |
| Vinylic filler: | | | | | | | | | |
| S/DVB/MAA [12] | 20 | 20 | | | | | | | |
| S/TAHT/MAA [18] | | | 20 | | | | | | |
| VT/DVB on S/MAH [23] | | | | 20 | 20 | | | | |
| S/DVB/ITA [24] | | | | | | 20 | | | |
| S/DVB/ITA [25] | | | | | | | 20 | | |
| S/DVB/ITA [26] | | | | | | | | 20 | |
| S/DVB on S/MAH [27] | | | | | | | | | 20 |
| Cyanoalkyl amine (Example No.): 1-TEPA (2-8) | | 1 | 1 | 1 | 1 | 1.5 | 1.5 | 1.5 | 1 |
| Stearic acid | 1 | 1 | 1 | 1 | 1 | 1 | 1 | 1 | 1 |

See footnotes at end of table.

Table 13—Continued
THE EFFECTIVENESS OF A MONO-CYANOALKYLATED POLYAMINE IN EIGHT DIFFERENT ACID STOCKS

| Example No | 13-1 Control | 13-2 | 13-3 | 13-4 | 13-5 | 13-6 | 13-7 | 13-8 | 13-9 |
|---|---|---|---|---|---|---|---|---|---|
| Compound No., B- | 2486 | 15480 | 15489 | 16342 | 16433 | 16434 | 16435 | 16436 | 14489 |
| AgeRite Resin D [3] | | 1 | 1 | 1 | 1 | 1 | 1 | 1 | 1 |
| Altax [11] | 1 | | | | | | | | |
| Zinc oxide | 5 | 3 | 3 | 3 | 3 | 3 | 3 | 3 | 3 |
| Captax [13] | 0.5 | | | | | | | | |
| Santocure [5] | | 1 | 1 | 1 | 1 | 1 | 1 | 1 | 1 |
| Ethyl tuads [14] | 0.15 | | | | | | | | |
| Sulfur | 2.5 | 2.5 | 2.5 | 2.5 | 2.5 | 2.5 | 2.5 | 2.5 | 2.5 |
| Mooney, ML-4 | 50 | 48 | 56 | 51 | 51 | 54 | 54 | 55 | 44 |
| Cure at 285° F., min | 90 | 75 | 90 | 30 | 30 | 75 | 75 | 75 | 30 |
| Elongation, percent | 815 | 760 | 785 | 765 | 800 | 800 | 760 | 765 | 725 |
| 300% modulus, p.s.i | 160 | 270 | 450 | 340 | 345 | 275 | 300 | 300 | 370 |
| Tensile, p.s.i | 1,055 | 3,360 | 3,570 | 3,475 | 3,430 | 3,370 | 3,200 | 3,460 | 3,515 |
| Hardness | 50 | 67 | 69 | 67 | 65 | 64 | 61 | 64 | 64 |
| Increase in tensile strength, percent | | 215 | 240 | 230 | 220 | 215 | 200 | 225 | 234 |

NOTE.—For footnotes 3 and 5 see Table 3, footnote 11 see Table 5, footnotes 12, 13, and 14 see Table 6, footnote 18 see Table 8.

[23] Colloidal dispersion of copolymer of vinyltoluene/divinylbenzene on styrene-maleic anhydride copolymer seed.
[24] Colloidal dispersion of copolymer of styrene/divinylbenzene/itaconic acid 80/10/10 Santomerse-3.
[25] Colloidal dispersion of copolymer of styrene/divinylbenzene/itaconic acid 80/10/10 Triton 770.
[26] Colloidal dispersion of copolymer of styrene/divinylbenzene/itaconic acid 80/10/10 Duponol ME.
[27] Colloidal dispersion of copolymer of styrene/divinylbenzene on styrene-maleic anhydride copolymer seed.

Table 13 (Concluded)

| | Cure, min. at 285° F. | P.s.i. tens. | Percent elong. | P.s.i. 300% mod. | Hardness |
|---|---|---|---|---|---|
| B-16434 | 60 | 3,100 | 775 | 300 | 68 |
| | 75 | 3,370 | 800 | 275 | 64 |
| | 90 | 3,130 | 765 | 320 | 69 |
| | 120 | 3,155 | 750 | 325 | 66 |
| B-16435 | 60 | 3,000 | 760 | 310 | 66 |
| | 75 | 3,200 | 760 | 300 | 61 |
| | 90 | 3,090 | 725 | 325 | 68 |
| | 120 | 3,100 | 715 | 330 | 64 |
| B-16436 | 60 | 3,010 | 775 | 315 | 69 |
| | 75 | 3,460 | 765 | 300 | 64 |
| | 90 | 3,250 | 750 | 300 | 68 |
| | 120 | 2,965 | 725 | 325 | 67 |

In Table 14 an example is given of the flat cure rate produced by the monocyanoalkylated polyamine. From 30 to 60 minutes the tensile values are practically constant between 3550 and 3590 p.s.i. At a 90 minute cure the tensile value drops only to 3200 p.s.i., while hardness and elongation are substantially the same as for 30 to 60 minutes' cure time.

Table 14
EXAMPLE FOR THE VERY FLAT CURE OF A MONOCYANOALKYLATED POLYAMINE IN AN ACIDIC GR-S 1500 STOCK

| Example No | 14-1 Control | 14-2 |
|---|---|---|
| Compound No., B- | 2486 | 11457 |
| Elastomer (GR-S 1500) | 100 | 100 |
| Vinylic filler: S/DVB/MAA+BD/VP+resorcinol-CH₂O [16] | | 26 |
| Cyanoalkylamine (Example No.): 1-TEPA (2-8) | | 1 |
| AgeRite Resin D [3] | | 1 |
| Zinc oxide | 5 | 3 |
| Stearic acid | 1 | 1 |
| Captax [13] | 0.5 | 1 |
| Altax [11] | 1 | |
| Monex [28] | | 0.2 |
| Ethyl tuads [14] | 0.15 | |
| Sulfur | 2.5 | 2 |
| Compound Mooney, ML-4 | 50 | 67 |
| Elongation, percent | 815 | 775 |
| 300% modulus, p.s.i | 160 | 375 |
| Tensile, p.s.i | 1,055 | 3,590 |
| Hardness | 50 | 67 |
| Increase in tensile strength, percent | | 230 |

| | Cure, min. at 285° F. | P.s.i. tens. | Percent elong. | P.s.i. 300% mod. | Hardness |
|---|---|---|---|---|---|
| B-11457 | 30 | 3,590 | 775 | 375 | 67 |
| | 45 | 3,570 | 760 | 515 | 70 |
| | 60 | 3,550 | 715 | 575 | 73 |
| | 90 | 3,200 | 715 | 480 | 70 |

NOTE.—For footnote 3 see Table 3, footnote 11 see Table 5, footnotes 13 and 14 see Table 6.

[16] Colloidal sized emulsion copolymer of styrene/divinylbenzene/methacrylic acid (80/10/10) grafted with butadiene vinylpyridine (15/5) and resorcinol-formaldehyde.
[28] Monex is tetramethyl thiuram monosulfide sold by the Naugatuck Chemical Division of the U.S. Rubber Company.

Two examples (15-2 and 15-3) in Table 15 demonstrate that the effectiveness of a polyamine as a curing aid for GR-S 1500, containing an acid vinylic filler is not influenced significantly by an increase in the number of cyanoalkyl groups from one to two.

2950 and 2835 are shown as maximum tensile values. Considering the higher molecular weight of the cyanoalkylated polyamine in Example 15-3, and the fact that in both compounds the same amount (1 part) is used, the effectiveness of the high substituted polyamine can be raised by the use of slightly higher amounts.

Table 15
EFFECT OF MONO- AND DI-CYANOALKYLATED POLYAMINE IN SAME ACID STOCK

| Example No | 15-1 Control | 15-2 | 15-3 |
|---|---|---|---|
| Compound No., B- | 2486 | 7434 | 7435 |
| Elastomer (GR-S 1500) | 100 | 100 | 100 |
| Vinylic filler: S/DVB/MAA [12] | 20 | 20 | 20 |
| Cyanoalkylamine (Example No.): | | | |
| 1-TETA (2-6) | | 1 | |
| 2-TETA (2-7) | | | 1 |
| Stearic acid | | 2 | 2 |
| AgeRite Resin D [3] | 1 | 1 | 1 |
| Zinc oxide | 5 | 3 | 3 |
| Santocure [5] | | 1 | 1 |
| Captax [13] | 0.5 | | |
| Ethyl tuads [14] | 0.15 | | |
| Altax [11] | 1 | | |
| Sulfur | 2.5 | 2.5 | 2.5 |
| Compound Mooney, ML-4 | 50 | 55 | 55 |
| Cure at 285° F., min | 90 | 90 | 105 |
| Elongation, percent | 815 | 650 | 715 |
| 300% modulus, p.s.i | 160 | 530 | 440 |
| Tensile, p.s.i | 1,055 | 2,950 | 2,835 |
| Hardness | 50 | 73 | 73 |
| Increase in tensile strength, percent | | 180 | 165 |

NOTE.—For footnotes 3 and 5 see Table 3, footnote 11 see Table 5, footnotes 12, 13, and 14 see Table 6.

In Table 16 the cyanoalkylation reaction is not limited to the pure distilled polyamines. The Example 16-2, a reaction product of one lactonitrile with the mixed polyamines remaining as residue from the distillation of tetraethylene pentamine was employed, while in 16-3 the reaction product with four lactonitriles was used. Both are effective as curing aids in an acid GR-S 1500 stock. Tensile values as high as 3240 p.s.i. are found in Example 16-2. As a further example for the flatness of the cure produced by the cyanoalkylated polyamine, all four cures are given for Examples 16-2 and 16-3. Over a range from 30 to 90 min., the tensile values change only from 3010 to 3240 p.s.i. in Example 16-2.

Table 16

EFFECT OF MONO- AND POLY-CYANOALKYLATED MIXED POLYAMINES IN SAME ACID GR-S 1500 STOCK

| Example No | 16-1 Control | 16-2 | 16-3 |
|---|---|---|---|
| Compound No., B- | 2486 | 12484 | 12485 |
| Elastomer (GR-S 1500) | 100 | 100 | 100 |
| Vinylic filler: S/DVB/MAA [12] | 20 | 20 | 20 |
| Cyanoalkylamine (Example No.): | | | |
| 1-MPAD (2-12) | | 1 | |
| 4-MPAD (2-13) | | | 1 |
| Stearic acid | 1 | 1 | 1 |
| AgeRite Resin D [3] | | 1 | 1 |
| Altax [11] | 1 | | |
| Zinc oxide | 5 | 3 | 3 |
| Captax [13] | 0.15 | | |
| Santocure [5] | | 1 | 1 |
| Ethyl tuads [14] | 0.5 | | |
| Sulfur | 2.5 | 2.5 | 2.5 |
| Mooney, ML-4 | 50 | 55 | 51 |
| Cure at 285° F., min | 90 | 60 | 90 |
| Elongation, percent | 815 | 750 | 785 |
| 300 percent modulus, p.s.i | 160 | 335 | 275 |
| Tensile, p.s.i | 1,055 | 3,240 | 2,780 |
| Hardness | 50 | 66 | 66 |
| Increase in tensile strength, percent | | 205 | 160 |

| | Cure, min. at 285° F. | p.s.i. tens. | Percent elong. | 300% mod., p.s.i. | Hardness |
|---|---|---|---|---|---|
| B-12484 | 30 | 3,065 | 915 | 205 | 63 |
| | 45 | 3,235 | 800 | 240 | 64 |
| | 60 | 3,240 | 750 | 335 | 66 |
| | 90 | 3,010 | 700 | 330 | 69 |
| B-12485 | 60 | 2,780 | 875 | 185 | 61 |
| | 90 | 2,780 | 785 | 275 | 66 |
| | 120 | 2,580 | 750 | 280 | 68 |

NOTE.—For footnotes 3 and 5 see Table 3, footnote 11 see Table 5, footnotes 12, 13, and 14 see Table 6.

In Table 16 it was shown that cyanoalkylated mixed polyamines from distillation residues can be used successfully as compounding ingredients. In Table 17 two other examples are given for mono- and tetracyanoalkylated mixed polyamine residues of different sources. In Example 17-2 tensile values as high as 3490 p.s.i. can be obtained by the use of only one part of the cyanoalkylated polyamine.

Table 17

EFFECT ON VULCANIZATION OF MONO- AND POLY-CYANOALKYLATED MIXED POLYAMINES IN DIFFERENT ACID GR-S 1500 STOCKS

| Example No | 17-1 Control | 17-2 | 17-3 |
|---|---|---|---|
| Compound No., B- | 2486 | 16469 | 9497 |
| Elastomer (GR-S 1500) | 100 | 100 | 100 |
| Vinylic filler: | | | |
| VT/DVB on S/MAH [23] | | 20 | |
| S/DVB/MAA [12] | 20 | | 20 |
| Cyanoalkylamine (Example No.): | | | |
| 1-MPAH (2-11) | | 1 | |
| 4-MPAC (2-31) | | | 1 |
| Stearic acid | 1 | 1 | 1 |
| AgeRite Resin D [3] | | 1 | 1 |
| Altax [11] | 1 | | |
| Zinc Oxide | 5 | 3 | 3 |
| Captax [13] | 0.5 | | |
| Santocure [5] | | 1 | 1 |
| Ethyl tuads [14] | 0.15 | | |
| Sulfur | 2.5 | 2.5 | 2.5 |
| Mooney, ML-4 | 50 | | 43 |
| Cure at 285° F., min | 90 | 20 | 90 |
| Elongation, percent | 815 | 875 | 760 |
| 300% modulus, p.s.i | 160 | 225 | 280 |
| Tensile, p.s.i | 1,055 | 3,490 | 2,925 |
| Hardness | 50 | 60 | 63 |
| Increase in tensile strength, percent | | 230 | 175 |

NOTE.—For footnotes 3 and 5 see Table 3, footnote 11 see Table 5, footnotes 12, 13, and 14 see Table 6, footnote 23 see Table 13.

Two examples are given in Table 18 for the reaction products of one and two lactonitrile with imino-bispropylamine. Tensile values as high as 3065 p.s.i. (Example 18-3) are obtained.

Table 18

EFFECT OF MONO- AND POLY-CYANOALKYLATED POLYAMINE ON VULCANIZATION OF ACID GR-S 1500 STOCK

| Example No | 18-1 Control | 18-2 | 18-3 |
|---|---|---|---|
| Compound No., B- | 2486 | 10445 | 10446 |
| Elastomer (GR-S 1500) | 100 | 100 | 100 |
| Vinylic filler: S/DVB/MAA [12] | 20 | 20 | 20 |
| Cyanoalkylamine (Example No.): | | | |
| 1-IBPA (2-14) | | 1 | |
| 2-IBPA (2-15) | | | 1 |
| AgeRite Resin D [3] | | 1 | 1 |
| Zinc oxide | 5 | 3 | 3 |
| Altax [11] | 1 | | |
| Stearic acid | 1 | 1 | 1 |
| Captax [13] | 0.5 | | |
| Santocure [5] | | 1 | 1 |
| Ethyl tuads [14] | 0.15 | | |
| Sulfur | 2.5 | 2.5 | 2.5 |
| Mooney, ML-4 | 50 | 63 | 45 |
| Cure at 285° F., min | 90 | 120 | 90 |
| Elongation, percent | 815 | 725 | 765 |
| 300% Modulus, p.s.i | 160 | 430 | 330 |
| Tensile, p.s.i | 1,055 | 2,850 | 3,065 |
| Hardness | 50 | 63 | 63 |
| Increase in tensile strength, percent | | 170 | 190 |

NOTE.—For footnotes 3 and 5 see Table 3, footnote 11 see Table 5, footnotes 12, 13, and 14 see Table 6.

Five examples are given in Table 19 for a cyanoalkylated polyamine. Diethylene triamine was progressively cyanoalkylated from one to five cyanoalkyl groups in the molecule. From each compound only one part was used in the compounding recipe. Increasing tensile strength starting from the 2875 p.s.i. in 19-2 up to 3440 p.s.i. in 19-6 is observed. Due to the higher molecular weight of the three to five substituted polyamine and the therefore slower reaction rate, the amount of accelerator (Santocure) was raised from 1 to 1.5 parts to obtain comparable rates of vulcanization.

Table 19

EFFECT OF SUBSEQUENT N-SUBSTITUTION OF POLYAMINE WITH A CYANOALKYL ON VULCANIZATION PROPERTIES IN ACID GR-S 1500 STOCK

| Example No | 19-1 Control | 19-2 | 19-3 | 19-4 | 19-5 | 19-6 |
|---|---|---|---|---|---|---|
| Compound No., B- | 2486 | 7436 | 6481 | 18484 | 18485 | 18486 |
| Elastomer (GR-S 1500) | 100 | 100 | 100 | 100 | 100 | 100 |
| Vinylic filler: S/DVB/MAA [12] | 20 | 20 | 20 | 20 | 20 | 20 |
| Cyanoalkylamine (Example No.): | | | | | | |
| 1-DETA (2-1) | | 1 | | | | |
| 2-DETA (2-2) | | | 1 | | | |
| 3-DETA (2-3) | | | | 1 | | |
| 4-DETA (2-4) | | | | | 1 | |
| 5-DETA (2-5) | | | | | | 1 |
| Stearic acid | 1 | 2 | 2 | 1 | 1 | 1 |
| AgeRite Resin D [3] | | 1 | | 1 | 1 | 1 |
| Zinc oxide | 5 | 3 | 3 | 3 | 3 | 3 |
| Captax [13] | 0.5 | | | | | |
| Santocure [5] | | 1 | 1 | 1.5 | 1.5 | 1.5 |
| Ethyl tuads [14] | 0.5 | | | | | |
| Altax [11] | 1 | | | | | |
| Sulfur | 2.5 | 2.5 | 2.5 | 2.5 | 2.5 | 2.5 |
| Mooney, ML-4 | 50 | 53 | 57 | 55 | 52 | 54 |
| Cure at 285° F., min | 90 | 90 | 60 | 90 | 90 | 90 |
| Elongation, percent | 815 | 710 | 810 | 765 | 750 | 765 |
| 300% modulus, p.s.i | 160 | 390 | 330 | 330 | 370 | 375 |
| Tensile, p.s.i | 1,055 | 2,875 | 2,980 | 3,245 | 3,290 | 3,440 |
| Hardness | 50 | 73 | 69 | 67 | 68 | 68 |
| Increase in tensile strength, percent | | 170 | 180 | 205 | 210 | 225 |

NOTE.—For footnotes 3 and 5 see Table 3, footnote 11 see Table 5, footnotes 12, 13, and 14 see Table 6.

In Table 20 are given two examples for a polyamine containing two ether linkages in the carbon chain. The mono- and the di-cyanoalkylated diamine are shown as compounding ingredients in acidic GR-S 1500 stocks. Both are effective in the vulcanization and with the mono-substituted amine tensile values up to 3510 p.s.i. (Example 20-2) were obtained.

by heating. When these materials are incorporated in acidic GR-S 1500 stocks, they act as very good curing aids as demonstrated by this table. Tensile values of 3000 p.s.i. are obtained, which represent an increase of more than 180% over the control.

*Table 20*

EFFECT OF MONO- AND POLY-CYANOALKYLATED POLYAMINES HAVING TWO OXYGEN IN THE CHAIN ON THE VULCANIZATION OF AN ACID GR-S 1500 STOCK

| Example No | 20-1 Control | 20-2 | 20-3 |
|---|---|---|---|
| Compound No., B- | 2486 | 18487 | 18488 |
| Elastomer (GR-S 1500) | 100 | 100 | 100 |
| Vinylic filler: S/DVB/MAA[12] | 20 | 20 | 20 |
| Cyanoalkylamine (Example No.): | | | |
| 1-EBOP (2-16) | | 1 | |
| 2-EBOP (2-17) | | | 1 |
| Stearic acid | | 1 | 1 |
| AgeRite Resin D[3] | 1 | 1 | 1 |
| Zinc oxide | 5 | 3 | 3 |
| Captax[13] | 0.5 | | |
| Santocure[5] | | 1.5 | 1.5 |
| Ethyl tuads[14] | 0.15 | | |
| Altax[11] | 1 | | |
| Sulfur | 2.5 | 2.5 | 2.5 |
| Mooney, ML-4 | 50 | 55 | 56 |
| Cure at 285° F., min | 90 | 90 | 60 |
| Elongation, percent | 815 | 675 | 710 |
| 300% modulus, p.s.i. | 160 | 540 | 400 |
| Tensile, p.s.i. | 1,055 | 3,510 | 3,000 |
| Hardness | 50 | 68 | 66 |
| Increase in tensile strength, percent | | 230 | 185 |

NOTE.—For footnotes 3 and 5 see Table 3, footnote 11 see Table 5, footnotes 12, 13, and 14 see Table 6.

*Table 21*

EFFECT OF POLY-CYANOALKYLATED DIAMINE, HAVING SIX CARBON BETWEEN THE NITROGEN ATOMS, ON THE VULCANIZATION OF AN ACID GR-S STOCK

| Example No | 21-1 Control | 21-2 | 21-3 |
|---|---|---|---|
| Compound No., B- | 2486 | 18489 | 18490 |
| Elastomer (GR-S 1500) | 100 | 100 | 100 |
| Vinylic filler: S/DVB/MAA[12] | 20 | 20 | 20 |
| Cyanoalkyl-amine (Example No.): | | | |
| 2-HMDA (2-18) | | 1 | |
| 4-HMDA (2-19) | | | 1 |
| Stearic acid | | 1 | 1 |
| AgeRite Resin D[3] | 1 | 1 | 1 |
| Zinc oxide | 5 | 3 | 3 |
| Captax[13] | 0.5 | | |
| Santocure[5] | | 1 | 1.5 |
| Ethyl tuads[14] | 0.15 | | |
| Altax[11] | 1 | | |
| Sulfur | 2.5 | 2.5 | 2.5 |
| Mooney, ML-4 | 50 | 57 | 52 |
| Cure at 285° F., min | 90 | 90 | 90 |
| Elongation, percent | 815 | 755 | 740 |
| 300% modulus, p.s.i. | 160 | 335 | 400 |
| Tensile, p.s.i. | 1,055 | 2,770 | 2,750 |
| Hardness | 50 | 67 | 67 |
| Increase in tensile strength, percent | | 163 | 161 |

NOTE.—For footnotes 3 and 5 see Table 3, footnote 11 see Table 5, footnotes 12, 13, and 14 see Table 6.

In Table 21 is shown the use of a di- and tetra-cyanoalkylated diamine with a straight hydrocarbon chain. 160% increase over the control was gained in tensile strength in comparison with the control.

In Table 22 it is demonstrated that the effectiveness of a polycyanoalkylated polyamine in the curing of an acidic GR-S 1500 stock is not limited to a specific compounding recipe. One part of the substituted polyamine is used in six different acceleration systems. Slight variations in the tensile values (from 2970 to 3380) are observed, and doubtless these values can be adjusted by using slightly different amounts of the accelerators. It is demonstrated in all six compounding formulae, the cyanoalkylated polyamine shows its effectiveness.

In Table 23: In the presence of cyanoalkylated mono- and polyamines, zinc oxide and stearic acid dissolve readily upon heating to about 130-140° C. and form clear transparent solutions. After cooling more or less hard wax-like products are formed which can be handled very easily. In Table 23 are given some examples for these materials and their effectiveness in the vulcanization of acidic GR-S 1500 stocks is demonstrated by six examples. The cyanoalkylation of the polyamine can be carried out while heating the amine with the zinc oxide and the stearic acid. In this case some water has to be evaporated. Other additives such as tall oil or petrolatum can be admixed (Example 23-2). The effect of these "compounded" cyano alkylated amines is of the same order as for the free cyanoalkylated amines.

In Table 23a: The reaction products of a cyanoalkyl-penta-substituted polyamine (1 mole) with zinc oxide (½ mole) and stearic acid (1 mole) (Example #23a-2) and the reaction product of the tricyanoalkylated polyamine with zinc oxide and stearic acid (Example 23a-3) are hard and brittle at room temperature, but easily soften

*Table 22*

EFFECTIVENESS OF A POLY-CYANOALKYLATED POLYAMINE IN SIX DIFFERENT COMPOUNDING RECIPES FOR AN ACID GR-S 1500 STOCK

| Example No | 22-1 Control | 22-2 | 22-3 | 22-4 | 22-5 | 22-6 | 22-7 |
|---|---|---|---|---|---|---|---|
| Compound No., B- | 2486 | 17404 | 17405 | 17406 | 17407 | 17409 | 17410 |
| Elastomer (GR-S 1500) | 100 | 100 | 100 | 100 | 100 | 100 | 100 |
| Vinylic filler: | | | | | | | |
| S/DVB/MAA[12] | 20 | | | | | | |
| S/TAHT/MAA[18] | | 20 | 20 | 20 | 20 | 20 | 20 |
| Cyanoalkyl-amine (Example No.): 3-TEPA (2-10) | | 1 | 1 | 1 | 1 | 1 | 1 |
| Stearic acid | 1 | 1 | 1 | 1 | 1 | 1 | 1 |
| AgeRite Resin D[3] | | 1 | 1 | 1 | 1 | 1 | 1 |
| Zinc oxide | 5 | 3 | 3 | 3 | 3 | 3 | 3 |
| Altax[11] | 1 | 1.5 | 1 | 1 | 1 | 1 | 1 |
| Captax[13] | 0.5 | | | | | | |
| DPG[19] | | 0.5 | | | | | |
| DOTG[29] | | | 0.5 | | | | |
| Monex[28] | | | | 0.15 | | | |
| Cumate[30] | | | | | | 0.15 | |
| Accelerator 808[31] | | | | | | 0.5 | |
| Trimene base[32] | | | | | | | 0.5 |
| Sulfur | 2.5 | 2.5 | 2.5 | 2.5 | 2.5 | 2.5 | 2.5 |
| Ethyl tuads[14] | 0.15 | | | | | | |
| Mooney, ML-4 | 50 | 53 | 51 | 53 | 53 | 53 | 53 |
| Cure at 285° F., min | 90 | 90 | 105 | 45 | 90 | 150 | 120 |
| Elongation, percent | 815 | 775 | 810 | 875 | 760 | 775 | 850 |
| 300% modulus, p.s.i. | 160 | 360 | 330 | 224 | 350 | 385 | 285 |
| Tensile, p.s.i. | 1,055 | 3,135 | 3,285 | 3,015 | 3,380 | 2,970 | 3,135 |
| Hardness | 50 | 67 | 67 | 64 | 64 | 69 | 68 |
| Increase in tensile strength, percent | | 195 | 210 | 185 | 220 | 180 | 195 |

NOTE.—For footnote 3 see Table 3, footnote 11 see Table 5, footnotes 12, 13, and 14 see Table 6, footnotes 18 and 19 see Table 8, footnote 28 see Table 14.
[29] Diorthotolylguanidine sold by DuPont de Nemours Co.
[30] Copper dialkyldithiocarbamate sold by R. T. Vanderbilt.
[31] Condensation product of butyraldehyde and aniline sold by E. I. duPont de Nemours & Co., Inc.
[32] A reaction product of ethylchloride, formaldehyde and ammonia sold by Naugatuck Chemical Division of U.S. Rubber Co.

Table 23
EFFECT OF "COMPOUNDED" CYANOALKYLATED AMINES ON VULCANIZATION OF ACID GR-S STOCKS

| Example No | 23-1 Control | 23-2 | 23-3 | 23-4 | 23-5 | 23-6 | 23-7 |
|---|---|---|---|---|---|---|---|
| Compound No., B- | 2486 | 10469 | 10470 | 10416 | 10417 | 10418 | 9496 |
| Elastomer (GR-S 1500) | 100 | 100 | 100 | 100 | 100 | 100 | 100 |
| Vinylic filler: S/DVB/MAA [12] | 20 | 20 | 20 | 20 | 20 | 20 | 20 |
| Cyanoalkyl amine composition: | | | | | | | |
| 11 g. allylaminopropionitrile, 28 g. stearic acid, 4 g. ZnO | | 4 | | | | | |
| 8 g. ZnO, 28 g. tall oil, 28 g. stearic acid, 20 g. petrolatum 2295, 9 g. polyamine H, 9 g. polyamine T, 14 g. lactonitrile | | | 4 | | | | |
| 29 g. cyanoalkylated polyamine (2-11), 28 g. stearic acid, 4 g. ZnO | | | | 2 | | | |
| 23 g. cyanoalkylated polyamine (2-11), 28 g. stearic acid, 4 g. ZnO | | | | | 2 | | |
| 23 g. cyanoalkylated polyamine (2-11), 56 g. stearic acid, 4 g. ZnO | | | | | | 3 | |
| 29 g. 2-TEPA (2-9), 28 g. stearic acid, 4 g. ZnO | | | | | | | 2 |
| Stearic acid | 1 | 1 | 1 | 1 | 1 | 1 | |
| AgeRite Resin D [3] | | 1 | 1 | 1 | 1 | 1 | 1 |
| Zinc oxide | 5 | 3 | 3 | 3 | 3 | 3 | 3 |
| Captax [13] | 0.5 | | | | | | |
| Santocure [5] | | 1 | 1 | 1 | 1 | 1 | 1 |
| Ethyl tuads [14] | 0.15 | | | | | | |
| Altax [11] | 1 | | | | | | |
| Sulfur | 2.5 | 2.5 | 2.5 | 2.5 | 2.5 | 2.5 | 2.5 |
| Mooney, ML-4 | 50 | 37 | 40 | 44 | 44 | 44 | 44 |
| Cure at 285° F., min | 90 | 90 | 90 | 30 | 45 | 45 | 45 |
| Elongation, percent | 815 | 700 | 715 | 1,000 | 785 | 825 | 740 |
| Modulus, 300% | 160 | 370 | 335 | 210 | 325 | 285 | 280 |
| Tensile, p.s.i. | 1,055 | 2,975 | 2,860 | 2,885 | 3,085 | 3,150 | 3,000 |
| Hardness | 50 | 67 | 66 | 57 | 63 | 64 | 63 |

NOTE.—For footnotes 3 and 5 see Table 3, footnote 11 see Table 5, footnotes 12, 13, and 14 see Table 6.

Table 23a
EFFECT OF "RESINOUS" CYANOALKYLATED POLYAMINES ON VULCANIZATION OF ACID GR-S STOCKS

| Example No | 23a-1 Control | 23a-2 | 23a-3 |
|---|---|---|---|
| Compound No., B- | 2486 | 19475 | 19476 |
| Elastomer (GR-S 1500) | 100 | 100 | 100 |
| Vinylic filler: | | | |
| S/DVB/MAA (80/10/10) [12] | 20 | | |
| VT/DVB (95/5) on 10 S/MAH [35] | | 20 | 20 |
| Cyanoalkylamine (Example No.): | | | |
| 5-DETA-S* | | 2 | |
| 3-DETA-S** | | | 2 |
| PBNA [17] | 1 | 1 | 1 |
| Stearic acid | 1 | 1 | 1 |
| Zinc oxide | 5 | 3 | 3 |
| Altax [11] | 1 | 1 | 1 |
| Captax [13] | 0.5 | | |
| Ethyl tuads [14] | 0.15 | | |
| DPG [19] | | 0.2 | 0.2 |
| Sulfur | 2.5 | 2.5 | 2.5 |
| Mooney, ML-4 | 50 | 48 | 47 |
| Cure at 285°F., min | 90 | 30 | 60 |
| Elongation, percent | 815 | 835 | 660 |
| 300% modulus, p.s.i. | 160 | 330 | 585 |
| Tensile, p.s.i. | 1,055 | 3,005 | 3,015 |
| Hardness | 50 | 65 | 63 |
| Increase in tensile strength, percent | | 185 | 186 |

*1 mole 5-DETA(2-5), 1 mole stearic acid and ½ mole ZnO.
**1 mole 3-DETA(2-3), 1 mole stearic acid and ½ mole ZnO.
NOTE.—For footnote 11 see Table 5, footnotes 12, 13, and 14 see Table 6, footnote 17 see Table 7, footnote 19 see Table 8, footnote 35 see Table 24.

When polycyanoalkyl polyamines are heated with small amounts of metal oxides or metal salts above 100° C., an exothermic reaction is initiated which is accompanied with an appreciable rise of temperature, depending on the nature of the salt or oxide. The reaction products are dark brown, very hard resinous materials with softening points of 100° C. and above.

For increased processibility of these resinous products (for instance, for the incorporation in elastomers on the mill) these resins can be plasticized with fatty acids, tall oil, mineral oils and the like.

These materials are hard and brittle at room temperature and the softening points are below 80° C. when plasticized.

Metal oxides, capable of initiating the reaction are for example: Zinc oxide, cadmium oxide, calcium oxide, magnesium oxide, lead mono and dioxide, stannous and stannic oxide, etc.

Salts capable of performing the resinification reaction are for instance: Zinc stearate, cobalt naphthenate, manganese naphthenate, and the like.

*Example I.*—36.8 g. 5-DETA (Table 2-5) are heated with 28 g. of stearic acid and 4 g. of zinc oxide. At 135° C. a violent reaction is initiated which causes the temperature to raise up to 195° C., forming a dark brown clear solution. The reaction product is hard and brittle at room temperature and has a softening point below 80° C.

*Example II.*—33.1 g. 4-HMDA (Table 2-19) are heated with 28 g. stearic acid and 4 g. zinc oxide. A violent reaction is initiated at 130° C. causing a temperature rise to 190° C. A clear dark brown solution is formed. The cold material is hard and brittle and the softening point is below 80° C.

*Example III.*—36.8 g. 5-DETA (Table 2-5) are heated with 32 g. zinc stearate. The zinc stearate dissolves at 150° C. readily in the cyanoalkyl amine and initiates a violent reaction, causing a temperature rise to 195° C. The resinous reaction product is hard and brittle at room temperature and has a softening point below 80° C.

The chemical structure of the cyanoalkyl group has some influence on the effectiveness of the substituted polyamine. In Table 24 four examples are given for cyanoalkylated polyamines and in Table 24a three examples of cyanomethyl polyethyleneamines are shown. In Example 24-2 and 24-3 the cyanoalkyl group is alpha-methylpropionitrile, in Example 24-4 it is alpha-phenylpropionitrile, and in 24-5 it is alpha-isopropenylpropionitrile and in 24a-2 and -3 the additives contain cyanomethyl groups. The highest tensile values are shown by the latter with 3055. However, the other cyanoalkylated polyamines of Tables 24 and 24a increased the tensile strengths from 135 to 181% above that of the control.

Table 24
EFFECTIVENESS OF CYANOALKYLATED POLYAMINES, WHEREIN CYANOALKYL IS OTHER THAN PROPIONITRILE, ON VULCANIZATION OF ACIDIC GR-S 1500 STOCKS

| Example No | 24-1 Control | 24-2 | 24-3 | 24-4 | 24-5 |
|---|---|---|---|---|---|
| Compound No., B- | 2486 | 9464 | 9465 | 19441 | 19445 |
| Elastomer (GR-S 1500) | 100 | 100 | 100 | 100 | 100 |
| Vinylic filler: | | | | | |
| S/DVB/MAA [12] | 20 | 20 | 20 | 20 | |
| VT/DVB on S/MAH [35] | | | | | 20 |
| Cyanoalkylamine (Example No.): | | | | | |
| 1-AC (2-32) | | 1 | | | |
| 2-AC (2-33) | | | 1 | | |
| 2-ACP (2-29) | | | | 1 | |
| 5-MIPK (2-30) | | | | | 1 |

See footnotes at end of table.

Table 24—Continued

| Example No. | 24-1 Control | 24-2 | 24-3 | 24-4 | 24-5 |
|---|---|---|---|---|---|
| Compound No., B- | 2486 | 9464 | 9465 | 19441 | 19445 |
| AgeRite Resin D [3] | | | | 1 | 1 |
| Zinc oxide | 5 | 3 | 3 | 3 | 3 |
| Stearic acid | 1 | 1 | 1 | 1 | 1 |
| Altax [11] | 1 | | | | |
| Captax [13] | 0.5 | | | | |
| Santocure [5] | | 1 | 1 | 1.5 | 1 |
| Ethyl tuads [14] | 0.15 | | | | |
| Sulfur | 2.5 | 2.5 | 2.5 | 2.5 | 2.5 |
| Mooney, ML-4 | 50 | 65 | 63 | 52 | 48 |
| Cure at 285° F., min | 90 | 90 | 120 | 90 | 45 |
| Elongation, percent | 815 | 650 | 675 | 650 | 690 |
| 300% modulus, p.s.i | 160 | 335 | 280 | 435 | 475 |
| Tensile, p.s.i | 1,055 | 2,500 | 2,760 | 2,580 | 3,055 |
| Hardness | 50 | 68 | 68 | 72 | 67 |
| Increase in tensile strength, percent | | 135 | 160 | 145 | 190 |

NOTE.—For footnotes 3 and 5 see Table 3, footnote 11 see Table 5, footnotes 12, 13, and 14 see Table 6.

[35] Copolymer of vinyl toluene and divinylbenzene (95/5) in presence of 10 pts. styrene-maleic anhydride copolymer.

Table 24a

EFFECTIVENESS OF CYANOALKYLATED POLYAMINES, WHEREIN CYANOALKYL IS OTHER THAN PROPIONITRILE, ON VULCANIZATION OF ACIDIC GR-S 1500 STOCKS

| Example No. | 24a-1 Control | 24a-2 | 24a-3 |
|---|---|---|---|
| Compound No., B- | 2486 | 19474 | 19477 |
| Elastomer (GR-S 1500) | 100 | 100 | 100 |
| Vinylic filler: | | | |
| S/DVB/MAA (80/10/10) [12] | 20 | | |
| VT/DVB on 10 S/MAH [35] | | 20 | 20 |
| Cyanoalkylamine (Example No.): | | | |
| 2G-TEPA (2-35) | | 1 | |
| 5G-DETA (2-36) | | | 1 |
| PBNA [17] | 1 | | |
| Stearic acid | 1 | 1 | 1 |
| AgeRite Resin D [3] | | 1 | 1 |
| Zinc oxide | 5 | 3 | 3 |
| Altax [11] | 1 | 1 | 1 |
| Captax [13] | 0.5 | | |
| Ethyl tuads [14] | 0.15 | | |
| DPG [19] | | 0.2 | 0.2 |
| Sulfur | 2.5 | 2.5 | 2.5 |
| Compound Mooney, ML-4 | 50 | 51 | 49 |
| Cure at 285° F., min | 90 | 90 | 60 |
| Elongation, percent | 815 | 690 | 775 |
| 300 percent modulus, p.s.i | 160 | 490 | 400 |
| Tensile, p.s.i | 1,055 | 2,925 | 2,960 |
| Hardness | 50 | 67 | 64 |
| Increase in tensile strength, percent | | 178 | 181 |

NOTE.—For footnote 3 see Table 3, footnote 11 see Table 5, footnotes 12, 13, and 14 see Table 6, footnote 17 see Table 7, footnote 19 see Table 8, footnote 35 see Table 24.

The data of Table 25 demonstrate that the cyanoalkylated amines are effective in grafted GR-S 1500 stocks containing, e.g., polyacrylic acid as well as in GR-S 1500 stocks containing a polyacid. Tensile strengths up to 4015 p.s.i. were obtained in Example 25-2 and an excellent flat cure is demonstrated by the values for four different cure times. The comparison of Examples 25-1 and 25-3 shows that besides the improved tensile values 3400 p.s.i. vs. 3660 an improvement of the 300% modulus could be achieved (from 2425 to 3315 p.s.i.).

Table 25

EFFECT OF CYANOALKYLATED POLYAMINE IN TWO DIFFERENT LEVELS ON VULCANIZATION OF GRAFTED ACID GR-S 1500 STOCKS

| Example No. | 25-1 | 25-2 | 25-3 |
|---|---|---|---|
| Compound No., B- | 15435 | 15436 | 15437 |
| Elastomer: | | | |
| GR-S 1500+40 MMA | 50 | 100 | 50 |
| Graft GR-S 1500 | 50 | | 50 |
| Source of acidity: | | | |
| Polyacrylic acid | | 2 | 2 |
| Philblack "O" | 40 | 40 | 40 |
| Cyanolalkylamine (Example No.): 1-TEPA | | 1 | 0.5 |
| Zinc oxide | 5 | 5 | 5 |
| Altax [11] | 1.75 | 1.75 | 1.75 |
| Sulfur | 1.5 | 1.5 | 1.5 |
| Mooney, ML-4 | >200 | >200 | 102 |

See footnote at end of table.

Table 25—Continued

| | Cure, min. at 285° F. | p.s.i. tens. | Percent elong. | 300% mod., p.s.i. | Hardness |
|---|---|---|---|---|---|
| Example 25-1 (B-15435) | 30 | 2,670 | 490 | 1,835 | 80 |
| | 60 | 3,400 | 475 | 2,425 | 82 |
| | 75 | 3,225 | 415 | 2,500 | 81 |
| | 90 | 3,330 | 350 | 2,665 | 82 |
| Example 25-2 (B-15436) | 30 | 3,465 | 400 | 2,860 | 82 |
| | 60 | 3,840 | 350 | 3,060 | 82 |
| | 90 | 4,015 | 375 | 3,180 | 83 |
| | 120 | 3,775 | 350 | 3,155 | 83 |
| Example 25-3 (B-15437) | 30 | 3,200 | 590 | 1,595 | 73 |
| | 60 | 3,530 | 510 | 2,015 | 73 |
| | 75 | 3,515 | 490 | 2,045 | 74 |
| | 90 | 3,660 | 475 | 3,315 | 76 |

NOTE.—For footnote 11 see Table 5.

Table 26 demonstrates that the cyanolkylated monoamine is effective in curing GR-S 1500 stocks containing an acid vinylic filler and a polyacid, together with carbon black. In Example 26-2 a high tensile strength of 3900 p.s.i. was obtained with 10 pts. of an acidic vinylic filler and 27 pts. of carbon black, whereas the hardness of the cured stock did not exceed 72.

Table 27: In this table it is shown that the cyanoalkylated polyamine is effective in the vulcanization of a GR-S 1500 stock containing entirely different types of polyacids together with 25 parts of carbon black. The substituted polyamine is a powerful curing aid for the carboxyl groups supplied by 2 pts. polyacrylic acid (Example 27-2) as well as for the carboxyl group supplied by 2 pts. of pectic acid or by a copolymeric acid (12.5 pts.) consisting of a copolymer of MAA/DVB/S (27.4). The highest tensile value (3850 p.s.i.) was obtained in Example 27-2 containing polymethacrylic acid.

Table 27a: The same polycyanoalkylated polyamine is shown in two different concentrations in two acidic GR-S 1500 stocks. As seen in Example 27a-2 a small amount (e.g., 0.5 pt. per hundred parts of polymer) of dicyanoalkyldiethylenetriamine was very effective. The tensile strength was 330 p.s.i. above that of the control. In Example 27a-3 where 1.5 pts. of cyanoalkylated amine were used to correspond to the higher amount of carboxyl groups (4 pts. of S/MAH copolymer) present in the GR-S 1500, a tensile strength of 3600 p.s.i. was obtained.

Table 26

EFFECT OF CYANOALKYLATED MONOAMINE IN GR-S STOCK CONTAINING ACIDIC VINYLIC FILLER AND POLYACID

| Example No. | 26-1 Control | 26-2 | 26-3 |
|---|---|---|---|
| Compound No., B- | 2486 | 6491 | 5488 |
| Elastomer (GR-S 1500) | 100 | 100 | 100 |
| Vinylic filler: | | | |
| S/DVB/MAA [12] | 20 | 10 | 5 |
| Polyacrylic acid | | 2 | |
| HAF black | | 27 | |
| SAF black | | | 36 |
| Cyanoalkylamine (Example No.): 1-IP (1-1) | | 0.5 | 1.0 |
| AgeRite Resin D [3] | | 1 | |
| Zinc oxide | 5 | 3 | 3 |
| Ethyl tuads [14] | 0.15 | | |
| Stearic acid | 1 | 1 | 2 |
| Altax [11] | 1 | | 2 |
| Santocure [5] | | 1 | |
| Captax [13] | 0.5 | | 1 |
| Sulfur | 2.5 | 2.5 | 1.9 |
| Mooney, ML-4 | 50 | 62 | 62 |
| Cure at 285°F., min | 90 | 75 | 90 |
| Elongation, percent | 815 | 620 | 580 |
| 300% modulus, p.s.i | 160 | 1,280 | 1,625 |
| Tensile, p.s.i | 1,055 | 3,900 | 3,270 |
| Hardness | 50 | 72 | 70 |

NOTE.—For footnotes 3 and 5 see Table 3, footnote 11 see Table 5, footnotes 12, 13, and 14 see Table 6.

Table 27

EFFECT OF CYANOALKYLATED POLYAMINE IN GR-S 1500—CARBON BLACK STOCK INDEPENDENT OF CHEMICAL NATURE OF ACID ADDITIVES

| Example No | 27-1 Control | 27-2 | 27-3 | 27-4 |
|---|---|---|---|---|
| Compound No., B- | 18491 | 6493 | 6495 | 7423 |
| Elastomer (GR-S 1500) | 100 | 100 | 100 | 100 |
| Source of acidity: | | | | |
| S/MAH [20] | 2 | | | |
| PMAA [23] | | 2 | | |
| Pectic acid | | | 2 | |
| MAH/DVB/S [36] | | | | 2 |
| Philblack "O" | 25 | 25 | 25 | 25 |
| Cyanoalkyl amine (Example No.): 1-TEPA (2-8) | | 0.5 | 0.5 | 0.5 |
| AgeRite Resin D | 1 | 1 | 1 | 1 |
| Zinc oxide | 3 | 3 | 3 | 3 |
| Stearic acid | 2 | 2 | 2 | 2 |
| Santocure | 1 | 1 | 1 | 1 |
| Sulfur | 2.5 | 2.5 | 2.5 | 2.5 |
| Mooney, ML-4 | 50 | 51 | 54 | 51 |
| Cure at 285° F., min | 60 | 20 | 45 | 45 |
| 300% modulus, p.s.i. | 1,360 | 860 | 1,220 | 825 |
| Elongation, percent | 480 | 690 | 590 | 650 |
| Tensile, p.s.i. | 3,100 | 3,850 | 3,650 | 3,725 |
| Hardness | 63 | 62 | 67 | 65 |
| Increase in tensile strength, percent | | 24 | 17 | 20 |
| Properties at 212° F.: | | | | |
| Tensile, p.s.i. | | 1,020 | 1,200 | 1,030 |
| Elongation, percent | | 310 | 310 | 330 |

NOTE.—For footnote 20 see Table 11, footnote 23 see Table 13.
[36] A copolymer of maleic anhydride divinylbenzene and styrene (1/0.1/1).

Table 27a

EFFECT OF CYANOALKYLATED POLYAMINE IN TWO DIFFERENT LOADS ON VULCANIZATION OF ACIDIC GR-S 1500 STOCK

| Example No | 27a-1 Control | 27a-2 | 27a-3 |
|---|---|---|---|
| Compound No., B- | 18491 | 6479 | 6480 |
| Elastomer (GR-S 1500) | 100 | 100 | 100 |
| Acid copolymer (S/MAH [20]) | | | 4 |
| Acid copolymer (MAA/MAH [37]) | | 1 | |
| Philblack "O" | 25 | 25 | 25 |
| Cyanoalkyl amine: 2-DETA (2-2) | | 0.5 | 1.5 |
| AgeRite Resin D [3] | 1 | 1 | 1 |
| Zinc oxide | 3 | 3 | 3 |
| Stearic acid | 2 | 2 | 2 |
| Santocure | 1 | 2 | 1 |
| Sulfur | 2.5 | 2 | 2 |
| Mooney, ML-4 | 50 | 48 | 48 |
| Cure at 285° F., min | 60 | 105 | 60 |
| Elongation, percent | 480 | 640 | 800 |
| 300% modulus, p.s.i. | 1,360 | 775 | 670 |
| Tensile, p.s.i. | 3,100 | 3,430 | 3,600 |
| Hardness | 63 | 62 | 61 |
| Increase in tensile strength, percent | | 10 | 16 |
| Properties at 212° F.: | | | |
| Tensile, p.s.i. | | 1,000 | 1,080 |
| Elongation, percent | | 365 | 495 |

NOTE.—For footnotes 3 and 5 see Table 3, footnote 20 see Table 11
[37] MAA/MAH is a copolymer of molar quantities of methacrylic acid and maleic anhydride.

Tables 28 through 33: Examples are given to demonstrate that the cyanoalkylated amines can be used as curing aids for GR-S compounds containing fillers other than HAF carbon black (Philblack "O") together with a polyacid. In all cases an improvement of tensile strength can be observed when the curing aids of this invention (in combination with the polyacids) are present. The carbon black controls in Tables 28, 29 and 30 are compounded without containing a polyacid. To demonstrate that the improvement in tensile strength is due to the use of the cyanoalkylated amine and not due to the presence of the polyacid alone, in Table 33 the tensile values for GR-S 1500 compounded with (a) Philblack "O" alone, (b) with Philblack "O" and polyacid, and (c) with a polyacid-cyanoalkylated amine combination, are compared. In Example 33-1 wherein two parts of styrene-maleic anhydride are present in the GR-S 1500, the tensile values are practically identical with those for Example 33-2 (3100 vs. 3165 p.s.i.). However when 3 parts of a cyanoalkylated monoamine are added as demonstrated in Example 33-3 the tensile strength increases to 3700 p.s.i.

In Table 34 is demonstrated the effectiveness of two different cyanoalkylated amines in the vulcanization of an acid terpolymer of butadiene, styrene and methacrylic acid. The tensile values are more or less in the same range, however, as similarly demonstrated in Examples 3-2 and 3-3 (Table 3), the elongation at maximum tensile strength is remarkably improved (28% in Example 34-2).

Table 35: Cyanoalkylated amine can also be used for curing neoprene containing acidic vinylic fillers. Acidic vinylic fillers retard the cure and sometimes even make it impossible to obtain acceptable properties of the vulcanizate; the presence of the cyanoalkylated amine in Examples 35-2 and 33-3 resulted in the same cure time as in the control 35-1.

Table 28

EFFECT OF MONO-CYANOALKYLATED POLYAMINE IN CURING OF GR-S 1500 STOCKS CONTAINING OTHER FILLER THAN VINYLIC FILLERS OR PHILBLACK "O"

[Furnex black reinforced GR-S 1500]

| Example No | 28-1 | 28-2 |
|---|---|---|
| Compound No., G- | 3912 | 4107 |
| Elastomer (GR-S 1500) | 100 | 100 |
| Polymethacrylic acid [21] | | 1 |
| Furnex | 35 | 35 |
| Cyanoalkyl amine (Example No.): 1-TEPA (2-8) | | 0.5 |
| AgeRite Resin D [3] | 1.0 | 1.0 |
| Circosol 2XH [4] | 2.5 | 2.5 |
| Para Flux 2016 [4] | 2.5 | 2.5 |
| Zinc oxide | 3.0 | 3.0 |
| Stearic acid | 1.0 | 1.0 |
| Santocure [5] | 1.0 | 1.0 |
| Sulfur | 2.5 | 2.5 |
| Mooney, ML-4 | 43 | 44 |
| Cure at 285° F., min | 60 | 30 |
| Elongation, percent | 810 | 780 |
| 300% modulus, p.s.i. | 470 | 550 |
| Tensile, p.s.i. | 2,310 | 2,680 |
| Hardness | 49 | 53 |
| Increase in tensile strength, percent | | 16 |
| Properties at 212° F.: | | |
| Tensile, p.s.i. | 550 | 730 |
| Elongation, percent | 350 | 435 |

NOTE.—For footnotes 3, 4, and 5 see Table 3, footnote 21 see Table 11.

Table 29

EFFECT OF MONO-CYANOALKYLATED POLYAMINE IN CURING OF GR-S 1500 STOCKS CONTAINING OTHER FILLER THAN VINYLIC FILLERS OR PHILBLACK "O"

[Micronex W-6 reinforced GR-S 1500]

| Example No | 29-1 | 29-2 |
|---|---|---|
| Compound No., G- | 3901 | 3895 |
| Elastomer (GR-S 1500) | 100 | 100 |
| Polymethacrylic acid [21] | | 1 |
| Micronex W-6 | 25 | 25 |
| Cyanoalkyl amine (Example No.): 1-TEPA (2-8) | | 0.5 |
| AgeRite Resin D [3] | 1 | 1 |
| Circosol 2XH [4] | 2.5 | 2.5 |
| Para Flux 2016 [4] | 2.5 | 2.5 |
| Zinc oxide | 3.0 | 3.0 |
| Stearic acid | 1 | 1 |
| Santocure [5] | 1 | 1 |
| Sulfur | 2.5 | 2.5 |
| Mooney, ML-4 | 45 | 45 |
| Cure at 285° F., min | 60 | 20 |
| Elongation, percent | 805 | 885 |
| 300% modulus, p.s.i. | 330 | 250 |
| Tensile, p.s.i. | 2,970 | 3,210 |
| Hardness | 50 | 50 |
| Increase in tensile strength, percent | | 8 |
| Properties at 212° F.: | | |
| Tensile, p.s.i. | 560 | 620 |
| Elongation, percent | 400 | 500 |

NOTE.—For footnotes 3, 4, and 5 see Table 3, footnote 21 see Table 11.

Table 30

EFFECT OF MONO-CYANOALKYLATED POLYAMINE IN CURING OF GR-S 1500 STOCKS CONTAINING OTHER FILLER THAN VINYLIC FILLERS OR PHILBLACK "O"

[Dixie clay reinforced GR-S 1500]

| Example No | 30-1 | 30-2 |
|---|---|---|
| Compound No., G- | 3898 | 3892 |
| Elastomer (GR-S 1500) | 100 | 100 |
| Polymethacrylic acid [21] | | 1 |
| Dixie clay | 72 | 72 |
| Cyanoalkyl amine (Example No.): 1-TEPA (2-8) | | 0.5 |
| AgeRite Resin D [3] | 1 | 1 |
| Circosol 2XH [4] | 2.5 | 2.5 |
| Para Flux 2016 [4] | 2.5 | 2.5 |
| Zinc oxide | 3 | 3 |
| Stearic acid | 1 | 1 |
| Santocure [5] | 1 | 1 |
| Sulfur | 2.5 | 2.5 |
| Mooney, ML-4 | 50 | 48 |
| Cure at 285° F., min | 120 | 45 |
| Elongation, percent | 780 | 810 |
| 300% modulus, p.s.i | 450 | 480 |
| Tensile, p.s.i | 1,980 | 2,420 |
| Hardness | 57 | 57 |
| Increase in tensile strength, percent | | 22 |
| Properties at 212° F.: | | |
| Tensile, p.s.i | 470 | 570 |
| Elongation, percent | 470 | 495 |

NOTE.—For footnotes 3, 4, and 5 see Table 3, footnote 21 see Table 11.

Table 31

EFFECT OF MONO-CYANOALKYLATED POLYAMINE IN CURING OF GR-S 1500 STOCKS CONTAINING OTHER FILLER THAN VINYLIC FILLERS OR PHILBLACK "O"

[Silene EF reinforced GR-S 1500]

| Example No | 31-1 | 31-2 |
|---|---|---|
| Elastomer (GR-S 1500) | 100 | 100 |
| Polymethacrylic acid [21] | | 1 |
| Silene EF | 57 | 57 |
| Cyanoalkyl amine (Example No.): 1-TEPA (2-8) | | 0.5 |
| AgeRite Resin D [3] | 1 | 1 |
| Circosol 2XH [4] | 2.5 | 2.5 |
| Para Flux 2016 [4] | 2.5 | 2.5 |
| Zinc oxide | 3 | 3 |
| Stearic acid | 1 | 1 |
| Santocure [5] | 1 | 1 |
| Sulfur | 2.5 | 2.5 |
| Mooney, ML-4 | 93.5 | 84 |
| Cure at 285° F., min | 60 | 30 |
| Elongation, percent | 770 | 810 |
| 300% modulus, p.s.i | 370 | 420 |
| Tensile, p.s.i | 1,800 | 2,010 |
| Hardness | 61 | 60 |
| Increase in tensile strength, percent | | 12 |
| Properties at 212° F.: | | |
| Tensile, p.s.i | 490 | 670 |
| Elongation, percent | 370 | 545 |

NOTE.—For footnotes 3, 4, and 5 see Table 3, footnote 21 see Table 11.

Table 32

EFFECT OF MONO-CYANOALKYLATED POLYAMINE IN CURING OF GR-S 1500 STOCKS CONTAINING OTHER FILLER THAN VINYLIC FILLERS OR PHILBLACK "O"

[Hi Sil reinforced GR-S 1500]

| Example No | 32-1 | 32-2 |
|---|---|---|
| Compound No., G- | 3896 | 3890 |
| Elastomer (GR-S 1500) | 100 | 100 |
| Polymethacrylic acid [21] | | 1 |
| Hi Sil | 54 | 54 |
| Cyanoalkyl amine (Example No.): 1-TEPA (2-8) | | 0.5 |
| AgeRite Resin D [3] | 1 | 1 |
| Circosol 2XH [4] | 2.5 | 2.5 |
| Para Flux 2016 [4] | 2.5 | 2.5 |
| Zinc oxide | 3 | 3 |
| Santocure [5] | 1 | 1 |
| Sulfur | 2.5 | 2.5 |
| Stearic acid | 1 | 1 |
| Mooney, ML-4 | 108 | 95 |
| Cure at 285° F., min | 120 | 120 |
| 300% modulus, p.s.i | 360 | 500 |
| Elongation, percent | 913 | 807 |
| Tensile, p.s.i | 2,090 | 2,530 |
| Hardness | 64 | 64 |
| Increase in tensile strength, percent | | 21 |
| Properties at 212° F.: | | |
| Tensile, p.s.i | 950 | 880 |
| Elongation, percent | 730 | 525 |

NOTE.—For footnotes 3, 4, and 5 see Table 3, footnote 21 see Table 11.

Table 33

GR-S 1500 WITH AND WITHOUT POLYACID AND WITH AND WITHOUT CYANOALKYLAMINE

| Example No | 33-1 | 33-2 | 33-3 |
|---|---|---|---|
| Compound No | B-18491 | G-3881 | B-6464 |
| Elastomer (GR-S 1500) | 100 | 100 | 100 |
| S/MAH [20] | 2 | | 2 |
| Philblack "O" [2] | 25 | 25 | 25 |
| Cyanoalkyl amine (Example No.): 1-IP (1-1) | | | 3 |
| AgeRite Resin D [3] | 1 | 1 | 1 |
| Circosol 2XH [4] | | 2.5 | |
| Para Flux 2016 [4] | | 2.5 | |
| Zinc oxide | 3 | 3 | 3 |
| Stearic acid | 2 | 3 | 2 |
| Santocure [5] | 1 | 1 | 1 |
| A-32 [7] | 0.2 | 0.2 | 0.2 |
| Sulfur | 2.5 | 2.5 | 2.5 |
| Mooney, ML-4 | 50 | 43.5 | 49 |
| Cure at 285° F., min | 60 | 60 | 20 |
| Elongation, percent | 480 | 660 | 725 |
| 300% modulus, p.s.i | 1,360 | 670 | 680 |
| Tensile, p.s.i | 3,100 | 3,165 | 3,700 |
| Hardness | 63 | 51 | 60 |

NOTE.—For footnotes 2, 3, 4, and 5 see Table 3, footnote 7 see Table 4, footnote 20 see Table 11.

Table 34

EFFECT OF TWO DIFFERENT CYANOALKYLATED AMINES IN ACIDIC POLYMERS

| Example No | 34-1 | 34-2 | 34-3 |
|---|---|---|---|
| Compound No., B- | 16498 | 17435 | 17403 |
| Elastomer BD/S/MAA (75/23/2) [33] | 100 | 100 | 100 |
| Philblack "O" [2] | 50 | 50 | 50 |
| Cyanoalkyl amine (Example No.): | | | |
| 3-TEPA (2-10) | | 1 | |
| 1-CH (1-7) | | | 1 |
| Stearic acid | 3 | 1 | 1 |
| Circo-Para [4] | 5 | 5 | 5 |
| AgeRite Resin D [3] | 1 | 1 | 1 |
| Zinc oxide | 3 | 3 | 3 |
| Santocure [5] | 1 | 1 | 1 |
| Sulfur | 1.75 | 1.75 | 1.75 |
| Mooney, ML-4 | 200+ | 141 | 200+ |
| Cure at 285° F., min | 90 | 90 | 60 |
| Elongation, percent | 300 | 385 | 350 |
| 300% modulus, p.s.i | 3,320 | 2,625 | 2,790 |
| Tensile, p.s.i | 3,320 | 3,490 | 3,325 |
| Hardness | 75 | 74 | 72 |
| Increase in elongation, percent | | 28 | 16 |

NOTE.—For footnotes 2, 3, 4, and 5 see Table 3.
[33] This is a terpolymer prepared to 59.5% conversion.

Table 35

EFFECT OF CYANOALKYLATED POLYAMINE ON VULCANIZATION OF NEOPRENE AND ACID VINYLIC FILLER

| Example No | 35-1 Control | 35-2 | 35-3 |
|---|---|---|---|
| Compound No., B- | 798 | 796 | 11408 |
| Elastomer (neoprene) | 100 | 100 | 100 |
| Vinylic filler: | | | |
| S/DVB/MAA [12] | | 20 | |
| S/DVB/MAA+BD/VP+resorcinol CH2O [16] | | | 26 |
| Cyanoalkylamine (Example No.): 2-TEPA (229) | | 1 | 1 |
| Magnesia | 4 | 4 | 4 |
| Neozone A [34] | 2 | 2 | 2 |
| Zinc oxide | 5 | 5 | 5 |
| DPG [19] | 0.75 | 0.75 | 0.75 |
| Sulfur | 1 | 1 | 1 |
| Compound Mooney, ML-4 | 31 | 47 | 79 |
| Cure at 285° F., min | 120 | 120 | 120 |
| Elongation, percent | 925 | 775 | 800 |
| 300% modulus, p.s.i | 115 | 435 | 790 |
| Tensile, p.s.i | 2,855 | 3,295 | 3,630 |
| Hardness | 42 | 70 | 68 |
| Increase in tensile strength, percent | | 15 | 27 |

NOTE.—For footnote 12 see Table 6, footnote 16 see Table 14, footnote 19 see Table 8.
[34] Neozone is phenyl-α-naphthylamine sold by E. I. du Pont de Nemours & Co., Inc.

In Table 36 three examples are given for the use of cyanoalkylated mono- and polyamines in natural rubber containing acidic vinylic fillers. Proper curing times of the stocks are assured by the use of these amines.

Table 36
EFFECT OF CYANOALKYLATED AMINES ON CURING NATURAL RUBBER CONTAINING ACIDIC VINYLIC FILLERS

| Example No | 36-1 | 36-2 | 36-3 | 36-4 |
|---|---|---|---|---|
| Compound No., B- | 1455 | 18408 | 18409 | 18410 |
| Elastomer (natural rubber) | 100 | 100 | 100 | [b]100 |
| Vinylic filler: S/DVB on S/MAH [27] | | 20 | 20 | 20 |
| Cyanoalkylamine (Example No.): | | | | |
| 3-TEPA (2-10) | | | 1 | |
| 1-TEPA (2-8) | | 1 | | |
| 1-IP (1-1) | | | | 1 |
| Zinc oxide | 5 | 5 | 5 | 5 |
| Altax | 1 | 1 | 1 | 1 |
| PBNA | | 1 | 1 | 1 |
| Stearic acid | 1 | 1 | 3 | 3 |
| Sulfur | 2.5 | 2.5 | 2.5 | 2.5 |
| Mooney, ML-4 | 16 | 19 | 16 | 12 |
| Cure at 285° F., min | 60 | 20 | 30 | 20 |
| Elongation, percent | 745 | 700 | 735 | 735 |
| 300% modulus, p.s.i | 221 | 360 | 415 | 470 |
| Tensile, p.s.i | 2,925 | 3,375 | 3,670 | 4,355 |
| Hardness | 32 | 57 | 60 | 63 |
| Increase in tensile strength, percent | | 15 | 25 | 49 |

NOTE.—For footnote 27 see Table 13.

[b] Compounded on the cold mill.

In Table 37 one example is given for the use of a cyanoalkylated amine in the vulcanization of a butadiene-acrylonitrile copolymer, containing an acidic vinylic filler. The reinforcing effect of the vinylic filler is enhanced by the use of the cyanoalkylated amine.

Table 37
EFFECT OF CYANOALKYLATED POLYAMINE ON VULCANIZATION OF BUTADIENE ACRYLONITRILE COPOLYMER CONTAINING ACID VINYLIC FILLER

| Example No | 37-1 | 37-2 |
|---|---|---|
| Compound No., B- | 11402 | 11401 |
| Elastomer [c] | 110 | 100 |
| Vinylic filler: S/DVB/MAA [12] | | 20 |
| Cyanoalkylamine (Example No.): 2-TEPA (2-9) | | 1 |
| AgeRite Resin D [3] | 1 | 1 |
| Zinc oxide | 3 | 3 |
| Stearic acid | 1 | 1 |
| Santocure [5] | 1 | 1 |
| Sulfur | 2.5 | 2.5 |
| Mooney, ML-4 | 92 | 118 |
| Cure at 285°F., min | 12 | 20 |
| Elongation, percent | 325 | 550 |
| 300% modulus, p.s.i | 265 | 545 |
| Tensile, p.s.i | 385 | 2,000 |
| Hardness | 50 | 70 |
| Increase in tensile strength, percent | | 420 |

NOTE.—For footnotes 3 and 5 see Table 3, footnote 12 see Table 6.
[c] Hycar 1512-X4 from B. F. Goodrich Chemical Co.

Table 38 shows that the saponification products of cyanoalkylated polyamines can be used in the curing of acidic GR-S 1500 stocks. Although through salt formation of the carboxyl groups with the nitrogen a part of the alkalinity of the amine has disappeared, it is still effective in the vulcanization of acidic GR-S 1500 stocks. An increase of 70% of the tensile strength is obtained.

Table 38
EFFECT OF SAPONIFICATION PRODUCT OF CYANOALKYLATED POLYAMINE ON VULCANIZATION OF ACIDIC GR-S 1500 STOCK

| Example No | 38-1 | 38-2 |
|---|---|---|
| Compound No., B- | 2486 | 19446 |
| Elastomer (GR-S 1500) | 100 | 100 |
| Vinylic filler: | | |
| S/DVB/MAA [12] | 20 | |
| VT/DVB on S/MAH [38] | | 20 |
| Saponified cyanoalkylamine: (Example No. 2-34) | 1 | 1 |
| Age Rite Resin D [3] | 1 | 3 |
| Zinc oxide | 5 | |
| Stearic acid | 1 | 1 |
| Altax [11] | 1 | |
| Captax [13] | 0.5 | |
| Santocure [5] | | 1.5 |
| Ethyl tuads [14] | .015 | |

See footnote at end of table.

Table 38—Continued

| Example No | 37-1 | 37-2 |
|---|---|---|
| Compound No., B- | 11402 | 11401 |
| Sulfur | 2.5 | 2.5 |
| Mooney, ML-4 | 50 | 50 |
| Cure at 285°F., min | 90 | 60 |
| Elongation, percent | 815 | 525 |
| 300% modulus, p.s.i | 160 | 625 |
| Tensile, p.s.i | 1,055 | 1,820 |
| Hardness | 50 | 71 |
| Increase in tensile strength, percent | | 70 |

NOTE.—For footnotes 3 and 5 see Table 3, footnote 11 see Table 5, footnotes 12, 13, and 14 see Table 6, footnote 35 see Table 24.

In Table 39 are compared the shelf-lives of compounds of an acidic GR-S 1500 stocks incorporating (a) an amine (Example 39-1), (b) monocyanoalkylated monoamines (Examples 39-2 and 39-3) and (c) a polycyanoalkylated polyamine. Due to the relatively low boiling point, the amines of 39-1 to -3 evaporated out of the stock upon standing, and when the compound was cured after storage of 10 days or more, low tensile strength was obtained. In Example 39-1, the tensile value obtained on compounds cured after storage for 37 days showed 2250 p.s.i. to be compared with 3200 p.s.i. when cured without storage. Similar behavior is found in Examples 39-2 and 39-3. The polycyanolakylated polyamine because of its relatively low volatility shows better uncured shelf-life. Upon aging the compounded stock for 73 days prior to vulcanization, the tensile strength was only 500 p.s.i. lower than that of the initial value when cured immediately after compounding (3480 vs. 2985 p.s.i.). This can be considered as a good shelf-life.

Table 39
AGING OF GR-S STOCK CONTAINING CYANOALKYLATED AMINES

| Example No | 39-1 | 39-2 | 39-3 | 39-4 |
|---|---|---|---|---|
| Compound No., B- | 2486 | 2478 | 2449 | 18422 |
| Allylamine | 3 | | | |
| Alpha-allylaminopropionitrile | | 4 | | |
| Alpha-isopropylaminopropionitrile | | | 4 | |
| 3-TEPA | | | | 1 |
| Freshly prepared: | | | | |
| Cure, min. at 285° F | 45 | 75 | 60 | 45 |
| Tensile, p.s.i | 3,200 | 2,670 | 3,320 | 3,480 |
| Elongation, percent | 730 | 850 | 720 | 715 |
| 300% modulus, p.s.i | 500 | 360 | 435 | 435 |
| Hardness | 72 | 58 | 64 | 57 |
| Time of storage (days) | 37 | 33 | 10 | 73 |
| Compounded stock: | | | | |
| Cure, min. at 285° F | 30 | 75 | 60 | 45 |
| Tensile, p.s.i | 2,250 | 1,620 | 1,680 | 2,985 |
| Elongation, percent | 710 | 680 | 600 | 750 |
| 300% modulus, p.s.i | 480 | 430 | 480 | 385 |
| Hardness | 56 | 61 | 69 | 66 |

In conclusion herein are disclosed new compositions of matter including:

(a) Cyanoalkyl polyamines
(b) Carboxyalkyl polyamines derived from cyanoalkyl polyamines
(c) Resinous materials derived from cyanoalkyl polyamines Further are disclosed that cyanoalkylamines are vulcanization aids for vulcanizable elastomers, especially:

(d) Natural rubber
(e) Diene-vinyl copolymers such as butadiene-styrene, butadiene-acrylonitrile, butadiene-styrene-methacrylic acid types
(f) Polar diene elastomers such as polychloroprene and including the vulcanization of these and the resulting vulcanizates.

Further disclosed are the use of cyanoalkylamines as vulcanizing aids with fillers including:

(g) Carbon black
(h) Polar and non-polar vinylic fillers
(i) Inorganic fillers such as the clay fillers, calcium silicate and silicon dioxide Included herein are the cyanoalkylamines as vulcanization aids with elastomers and filler in combinations and the vulcanization of such and the resulting vulcanizates.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A vulcanizable composition comprising (a) vulcanizable polymer material selected from the class consisting of natural rubber and synthetic diene polymers containing ethenoid unsaturation; (b) from about 0.05 to 10 parts of cyanoalkylamine per 100 parts, by weight, of the vulcanizable polymer material, said cyanoalkylamine being selected from the group consisting of the alpha-cyanoalkylamines and the beta-cyanoalkylamines and containing only hydrogen, amine-nitrogen, cyano-nitrogen and from 2 to 34 carbon atoms; and (c) a filler.

2. Composition of claim 1 in which the vulcanizable polymer material comprises synthetic polymer containing carboxyl groups.

3. Composition of claim 1 in which the filler comprises colloidal sized cross-linked polymer from ethylenically unsaturated compounds and contains groups selected from the class consisting of carboxyl and carbonyl groups.

4. A vulcanizable composition comprising (a) vulcanizable polymer material selected from the class consisting of natural rubber and synthetic diene polymers containing ethenoid unsaturation; and (b) from about 0.05 to 10 parts of cyanoalkylamine per 100 parts, by weight, of the vulcanizable polymer material, said cyanoalkylamine being selected from the group consisting of the alpha-cyanoalkylamines and the beta-cyanoalkylamines and containing only hydrogen, amine-nitrogen, cyano-nitrogen and from 2 to 34 carbon atoms.

5. Composition of claim 4 in which the vulcanizable polymer material comprises synthetic polymer containing carboxyl groups.

6. In the vulcanization of vulcanizable polymer stock selected from the class consisting of natural rubber and synthetic diene polymers containing ethenoid unsaturation, which polymer stock comprises synthetic polymer containing carboxyl groups, the method of reducing the deleterious effect on such vulcanization of such carboxyl groups that consists essentially in incorporating in the stock a sufficient quantity of cyanoalkylamine material to substantially reduce such effect, such quantity being an amount by weight of not less than about 0.05 and not more than about 10 parts per 100 parts of said vulcanizable unsaturated polymer, said cyanoalkylamine being selected from the group consisting of the alpha-cyanoalkylamines and the beta-cyanoalkylamines and containing only hydrogen, amine-nitrogen, cyano-nitrogen and from 2 to 34 carbon atoms.

References Cited in the file of this patent

UNITED STATES PATENTS

| | | |
|---|---|---|
| 2,439,359 | Dixon et al. | Apr. 6, 1948 |
| 2,697,727 | Kaiser et al. | Dec. 21, 1954 |
| 2,724,708 | Williams et al. | Nov. 22, 1955 |
| 2,743,291 | De Benneville | Apr. 24, 1956 |
| 2,802,806 | Doak | Aug. 13, 1957 |
| 2,809,179 | Endres et al. | Oct. 8, 1957 |